US 6,568,978 B2

(12) United States Patent
Kataoka et al.

(10) Patent No.: US 6,568,978 B2
(45) Date of Patent: May 27, 2003

(54) ELECTRODE SUBSTRATE, METHOD FOR PRODUCING THE SAME, AND DISPLAY DEVICE INCLUDING THE SAME

(75) Inventors: Yoshiharu Kataoka, Osaka (JP); Takashi Fujikawa, Nara (JP); Masafumi Kokura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 54 days.

(21) Appl. No.: 09/814,168

(22) Filed: Mar. 22, 2001

(65) Prior Publication Data

US 2001/0028217 A1 Oct. 11, 2001

(30) Foreign Application Priority Data

Mar. 31, 2000 (JP) .................................. 2000-099933
Mar. 31, 2000 (JP) .................................. 2000-099934
Mar. 31, 2000 (JP) .................................. 2000-099935
Dec. 28, 2000 (JP) .................................. 2000-403387
Jan. 19, 2001 (JP) .................................. 2001-012526
Jan. 19, 2001 (JP) .................................. 2001-012527

(51) Int. Cl.[7] .......................................... H01L 21/443
(52) U.S. Cl. ................................................... 445/24
(58) Field of Search .............................. 445/24; 438/609

(56) References Cited

U.S. PATENT DOCUMENTS 5,677,240 A * 10/1997 Murakami et al. .......... 438/609
5,737,049 A *  4/1998 Shin et al. ................... 349/122
5,989,782 A    11/1999 Nishiki et al.

FOREIGN PATENT DOCUMENTS

JP      61-233531      10/1986
JP       9-61836        3/1997
JP      11-283934      10/1999

* cited by examiner

Primary Examiner—Kenneth J. Ramsey
(74) Attorney, Agent, or Firm—Nixon & Vanderhye, P.C.

(57) ABSTRACT

A method for producing an electrode substrate, having an organic insulating region formed of an organic insulating material and an inorganic insulating region formed of an inorganic insulating material on an identical side thereof, includes the steps of performing a plasma treatment of the organic insulating region; forming a first transparent conductive layer in contact with the organic insulating region and a second transparent conductive layer in contact with the inorganic insulating region; and etching the first transparent conductive layer and the second transparent conductive layer in the same step.

14 Claims, 18 Drawing Sheets

US 6,568,978 B2

ELECTRODE SUBSTRATE, METHOD FOR PRODUCING THE SAME, AND DISPLAY DEVICE INCLUDING THE SAME

BACKGROUND OF THE INVENTION

1. Field of the Invention

The present invention relates to an electrode substrate including a transparent conductive layer which is in contact with both an inorganic insulating region formed of an inorganic insulating layer and an organic insulating region formed of an organic insulating layer, a method for producing the same, and a display device including the same.

2. Description of the Related Art

A transparent conductive layer including ITO (indium tin oxide) is usable as an electrode for allowing light to transmit therethrough and controlling light transmission. Attempts have been made to practically use an electrode substrate having such a transparent conductive layer in, for example, display devices including electroluminescence display devices, touch panels, and solar cells.

An exemplary display device including an electrode substrate having a transparent conductive layer both on an organic insulating layer and an inorganic insulating layer is a liquid crystal display device. A liquid crystal display device is now actively studied as a type of flat panel display device for replacing a CRT display. The liquid crystal display device has already been practically used in a battery-driven super-compact TV, a notebook computer or the like. Hereinafter, a liquid crystal display device including an electrode substrate including a transparent conductive layer provided on both an organic insulating layer and an inorganic insulating layer will be described.

FIG. 1 schematically shows a basic structure of a liquid crystal display device 100. The liquid crystal display device 100 is of an active matrix TFT array type, using thin film transistors (TFT) as switching devices. Such a type of display device is advantageous to provide a high quality display.

As shown in FIG. 1, the liquid crystal display device 100 includes an upper substrate 102, a lower substrate 101 as an electrode substrate, and a liquid crystal layer 109 interposed between the upper substrate 102 and the lower substrate 101. Liquid crystal molecules in the liquid crystal layer 109 are controlled by the upper substrate 102 and the lower substrate 101.

The lower substrate 101 includes an insulating plate 20; and a plurality of gate lines 105, a plurality of source lines 106, a plurality of pixel electrodes 103, and a plurality of TFTs 108 respectively provided in correspondence with the plurality of pixel electrodes 103, which are provided on the insulating plate 20. The plurality of pixel electrodes 103 are each connected to the corresponding gate line 105 and the corresponding source line 106 through the corresponding TFT 108.

FIG. 2 is a plan view of the lower substrate 101. The planar region of the lower substrate 101 includes a display region 150 (hatched in FIG. 2) and a peripheral region 160. The display region 150 includes the plurality of pixel electrodes 103 and the plurality of TFTs 108 for controlling the pixel electrodes 103 connected thereto. The pixel electrodes 103 are each formed of a transparent conductive layer. Since the liquid crystal display device 100 (FIG. 1) is of a transmission type, at least a part of the insulating plate 20 is formed of a transparent material, and the pixel electrodes 103 are formed of a transparent conductive material, so that an image is displayed using light (generally, light from a light source) passing to the display side from the side opposite to the display side of the liquid crystal display device 100. In this manner, the light is transmitted and controlled. The liquid crystal display device 100 (FIG. 1) is of a transparent type, but the description here is applicable to a transmission region of a liquid crystal display device of a transmission/reflection type.

The peripheral region 160 includes a plurality of gate connection terminals 110, a plurality of source connection terminals 120, and a plurality of common connection terminals 130. The plurality of gate connection terminals 110 are respectively connected to the plurality of gate lines 105; the plurality of source connection terminals 120 are respectively connected to the plurality of source lines 106; and the plurality of common connection terminals 130 are respectively connected to a plurality of common lines 107. The gate lines 105, the source lines 106 and the common lines 107 are provided in the peripheral region 160 and extend to the display region 150. In this specification, each gate connection terminal 110 and the vicinity thereof will be referred to as a "gate connection terminal area 111", each source connection terminal 120 and the vicinity thereof will be referred to as a "source connection terminal area 121", and each common connection terminal 130 and the vicinity thereof will be referred to as a "common connection terminal area 131". The gate connection terminal areas 111, source connection terminal areas 121 and the common connection terminal area 131 will be collectively referred to as a "peripheral terminal area".

FIG. 3 is an enlarged plan view of the display region 150 of the lower substrate 101. One pixel electrode 103 is indicated by a dashed line in FIG. 3. The gate lines 105 and the common lines 107 are provided parallel to each other, and the source lines 106 are provided perpendicular to the gate lines 105 and the common lines 107. In the vicinity of an intersection of each gate line 105 and each source line 106, the gate line 105 is branched to be connected to a gate electrode of the TFT 108, and the source line 106 is branched to be connected to a source electrode of the TFT 108. A connection electrode 48 which is connected to a drain electrode of the TFT 108 is provided to partially overlap the corresponding common line 107. An area in which the connection electrode 48 and the common line 107 overlap each other has a contact hole 50.

FIG. 4 is a cross-sectional view of the display region 150 of the substrate 101 along line A–A' in FIG. 3. In FIG. 4, the area including the gate line 105 and the vicinity thereof will be referred to as a "TFT area", and the area including the common electrode 107 and the vicinity thereof will be referred to as a "contact hole area".

In the TFT area, the gate line 105 (more specifically, the branched portion of the gate line 105) is provided on the insulating plate 20. A gate insulating layer 44 is provided on the insulating plate 20 so as to cover the gate line 105. The gate insulating layer 44 can be formed of silicon nitride ($SiN_x$). An amorphous semiconductor layer 45 is provided on the gate insulating layer 44, and the source electrode 46a and the drain electrode 46b of the TFT 108 are provided on the amorphous semiconductor layer 45 with a gap interposed therebetween. As described above, the source electrode 46a is connected to the source line 106, and the drain electrode 46b is connected to the connection electrode 48. The TFT 108 including the above-described elements is covered with an organic insulating layer 49 formed of a transparent material. The organic insulating layer 49 has a flat top face, and the pixel electrode 103 is provided on the organic insulating layer 49.

In the contact area, the common electrode 107 is provided on the insulating plate 20, and the gate insulating layer 44 is provided on the insulating plate 20 so as to cover the common electrode 107. The gate insulating layer 44 is covered with the connection electrode 48. The gate insulating layer 44 is covered with the organic insulating layer 49. The pixel electrode 103 is provided on the organic insulating layer 49. The contact hole 50 is provided so that the connection electrode 48 and the pixel electrode 103 are in direct contact with each other.

The above-described structure of the display region 150 provides a high numerical aperture mainly for the following two reasons. (1) Since the surface of the organic insulating layer 49 on which the pixel electrode 103 is provided is flat, the display defect (domain phenomenon) caused by an alignment disturbance of liquid crystal molecules in the liquid crystal layer 109 (FIG. 1) at a step portion at an each end of the pixel electrode over the TFT 108 is alleviated, and thus the effective display area in the liquid crystal layer can be increased. (2) Since the organic insulating layer 49 underlying the pixel electrode 103 is relatively thick with a thickness of 0.3 µm to 2 µm, the pixel electrode 103 on the organic insulating layer 49 (on the display side) and the gate line 105/the source line 106 on the other side of the organic insulating layer 49 from the pixel electrode 103 do not shortcircuit each other. Therefore, the pixel electrodes 103 can be provided so as to overlap the gate line 105, the source line 106 and other lines when seen from the display side, and thus the area of the pixel electrode 103 can be increased.

In general, in the peripheral region 160 (FIG. 2), a transparent conductive layer is provided on an inorganic insulating layer which is a part of the electrode. The transparent conductive layer provided on the inorganic insulating layer prohibits oxidation of the peripheral terminal area and the resulting increase in the resistance of the gate connection terminals 110, the source connection terminals 120 and the common connection terminals 130. It is possible to provide these terminals 110, 120 and 130 in the peripheral terminal area on the organic insulating layer, but it is not preferable since defective connection with other components may occur to reduce the reliability and the organic insulating layer can undesirably become brittle.

The transparent conductive layer is generally wet-etched. Dry-etching is not preferable for the following reasons. (1) Dry-etching will change the quality of the organic insulating layer and thus the insulating quality is deteriorated. (2) In the case where the electrode substrate described above is used for a liquid crystal display device, a liquid crystal layer can undesirable be contaminated by the dry-etching residue, deteriorating the display quality. In this specification, the term "etching" refers to "wet-etching" unless otherwise specified.

In this specification, the term "etching shift" refers to a length of a layer which is removed by etching. An etching shift per unit time is referred to as an "etching rate".

It might be considered that the transparent conductive layer provided on the organic insulating layer and the transparent conductive layer provided on the inorganic insulating layer can be etched simultaneously, i.e., in the same step. In practice, however, it is not preferable for the following reason. Etching shifts of the two transparent conductive layers are different. When the transparent conductive layer on the organic insulating layer and the transparent conductive layer provided on the inorganic insulating layer are designed to be a substantially identical size and etched in a similar manner, the two transparent conductive layers become different in size due to the different etching shifts, i.e., the different rates. As a result, as shown in FIG. 5, the designing size and the finally resulting size of one of the transparent conductive layers become different. Accordingly, the two transparent conductive layers cannot be etched in the same step.

With reference to FIG. 6, a method for producing the pixel electrode 103 (transparent conductive layer), the gate connection terminal 110, the source connection terminal 120 and the common connection terminal 130 of the electrode substrate 101 shown in FIG. 2 will be described. Regarding the pixel electrode 103, specifically a portion thereof in the TFT 108 area is shown in FIG. 6. The other portion of the pixel electrode 103 is produced in substantially the same manner.

In step (a), a transparent conductive layer 155 (formed, for example, ITO) is formed in the TFT area and the peripheral region 160 in the same step.

The transparent conductive layer 155 in the TFT area, which is to become the pixel electrode 103, is formed on the flat surface of the organic insulating layer 49.

In each of the gate and common connection terminal areas 111 and 131 of the peripheral region 160, the gate line 105 or the common line 107 is formed on the insulating plate 20. An inorganic insulating layer 144 is formed on the gate line 105 or the common line 107, although the inorganic insulating layer 144 is not provided on the center of the gate line 105 or the common line 107. On the center of the gate line 105 or the common line 107, an electrode 154 is formed. Then, a transparent conductive layer 155 is formed on the inorganic insulating layer 144 so as to cover the electrode 154. The transparent conductive layer 155 is to become a transparent conductive layer 157 having a stable connection resistance.

In step (b), photoresist patterning is performed in the peripheral region 160 as follows. First, a first photoresist layer 165 is formed on an area of the transparent conductive layer 155, which is to be left (i.e., the area to become a transparent conductive layer 157). The first photoresist layer 165 is formed of a positive resist, for example, of a novolac resin available from Tokyo Ohka Kogyo Co., Ltd. In step (b), in the TFT area, the first photoresist layer 165 is formed on the entire surface of the transparent conductive layer 155.

In step (c), in the peripheral region 160, the transparent conductive layer 155 is removed by wet-etching except for the area covered with the first photoresist layer 165.

In step (d), the first photoresist layer 165 is removed. The transparent electrode 157 formed of the transparent conductive layer 155 is formed in the peripheral region 160, whereas the transparent conductive layer 155 remains without being removed even partially in the TFT area.

In step (e), photoresist patterning is performed in the TFT area. First, a second photoresist layer 167 is formed on an area of the transparent conductive layer 155, which is to be left (i.e., the area which is to become the pixel electrode 103). The second photoresist layer 167 is formed of a positive resist, for example, of a novolac resin available from Tokyo Ohka Kogyo Co., Ltd. In step (e), in the peripheral region 160, the second photoresist layer 167 is formed on the entire surface of the resultant laminate.

In step (f), in the TFT area, the transparent conductive layer 155 is removed by wet-etching except for the area covered with the second photoresist layer 167.

In step (g), the second photoresist layer 167 is removed, thereby forming the pixel electrode 103.

As described above, the transparent conductive layer 155 on the inorganic insulating layer 144 and the transparent conductive layer 155 on the organic insulating layer 49 need to be etched separately (steps (c) and (f)) due to the different etching rates.

In order to solve the above-described inconvenience, for example, use of plasma treatment, has been proposed as follows.

Japanese Laid-Open Publication No. 9-152625 discloses a method for producing an electrode substrate by treating an organic insulating layer with an oxygen plasma and then forming a transparent conductive layer in order to improve the adherence between the organic insulating layer and the transparent conductive layer.

Japanese Laid-Open Publication No. 11-283934 discloses a method of treating an organic insulating layer with a gas such as, for example, $CF_4+O_2$ in order to improve the electric connection between the pixel electrode and the drain electrode which are connected through a contact hole formed in the organic insulating layer, so as to enhance the display quality. However, use of the mixture gas of $CF_4+O_2$ or the like for plasma treatment raises the etching rate of the transparent conductive layer on the organic insulating layer. Therefore, again, the transparent conductive layer on the organic insulating layer and the transparent conductive layer on the inorganic insulating layer cannot be etched in the same step.

SUMMARY OF THE INVENTION

According to one aspect of the invention, a method for producing an electrode substrate, having an organic insulating region formed of an organic insulating material and an inorganic insulating region formed of an inorganic insulating material on an identical side thereof, includes the steps of performing a plasma treatment of the organic insulating region; forming a first transparent conductive layer in contact with the organic insulating region and a second transparent conductive layer in contact with the inorganic insulating region; and etching the first transparent conductive layer and the second transparent conductive layer in the same step.

In one embodiment of the invention, the step of performing the plasma treatment includes the step of performing a plasma treatment of the inorganic insulating region in the same step with the plasma treatment of the organic insulating region.

In one embodiment of the invention, the plasma treatment is selected from the group consisting of an oxygen plasma treatment, an Ar plasma treatment and a $CF_4$ plasma treatment.

In one embodiment of the invention, the plasma treatment includes the step of performing an oxygen plasma treatment and the step of performing an Ar plasma treatment following the step of performing the oxygen plasma treatment.

In one embodiment of the invention, the plasma treatment includes the step of performing an oxygen plasma treatment and the step of performing a $CF_4$ plasma treatment following the step of performing the oxygen plasma treatment.

In one embodiment of the invention, the plasma treatment makes a root-mean-square of a surface roughness of the organic insulating layer 1.0 nm or less.

In one embodiment of the invention, the method for producing an electrode substrate further includes the step of heat-treating the first transparent conductive layer and the second transparent conductive layer after the step of plasma treatment.

In one embodiment of the invention, the heat-treatment is performed at a temperature of 150° C. or higher and 220° C. or lower.

According to another aspect of the invention, a method for producing an electrode substrate, having an organic insulating region formed of an organic insulating material and an inorganic insulating region formed of an inorganic insulating material on an identical side thereof, includes the steps of forming a first transparent conductive layer in contact with the organic insulating region and a second transparent conductive layer in contact with the inorganic insulating region so that the first transparent conductive layer has a crystal grain size of 20 nm or more and 50 nm or less; and etching the first transparent conductive layer and the second transparent conductive layer in the same step.

In one embodiment of the invention, the first transparent conductive layer has a crystal grain size of 20 nm or more and 40 nm or less.

In one embodiment of the invention, the method for producing an electrode substrate further includes the step of performing a plasma treatment of the organic insulating region before the first transparent conductive layer is formed.

According to still another aspect of the invention, a method for producing an electrode substrate, having an organic insulating region formed of an organic insulating material and an inorganic insulating region formed of an inorganic insulating material on an identical side thereof, includes the steps of forming a first transparent conductive layer in contact with the organic insulating region and a second transparent conductive layer in contact with the inorganic insulating region; heat-treating the first transparent conductive layer and the second transparent conductive layer; and etching the first transparent conductive layer and the second transparent conductive layer in the same step.

In one embodiment of the invention, the heat-treatment is performed at a temperature of 150° C. or higher and 220° C. or lower which is maintained for a certain period of time.

In one embodiment of the invention, the heat-treatment is performed at a temperature of 200° C. or higher and 220° C. or lower which is maintained for a certain period of time.

According to still another aspect of the invention, a electrode substrate includes an organic insulating region formed of an organic insulating material and having a root-mean-square of a surface roughness of 1.0 nm or less; an inorganic insulating region formed of an inorganic insulating material provided on an identical side with the organic insulating region; and a first transparent conductive layer in contact with the organic insulating region and a second transparent conductive layer in contact with the inorganic insulating region.

In one embodiment of the invention, the root-mean-square of the surface roughness of the organic insulating region is 0.28 nm or more and 1.0 nm or less.

In one embodiment of the invention, the first transparent conductive layer has a crystal grain size of 20 nm or more and 50 nm or less.

In one embodiment of the invention, the first transparent conductive layer has a crystal grain size of 20 nm or more and 40 nm or less.

According to still another aspect of the invention, a display device includes any of the above-described electrode substrates.

According to still another aspect of the invention, an electrode substrate includes an organic insulating region formed of an organic insulating material; an inorganic insulating region formed of an inorganic insulating material provided on an identical side with the organic insulating region; and a first transparent conductive layer in contact with the organic insulating region and a second transparent conductive layer in contact with the inorganic insulating region. The first transparent conductive layer has a crystal grain size which is set so that the first transparent conductive layer and the second transparent conductive layer have substantially an equal shift rate.

In one embodiment of the invention, the first transparent conductive layer has a crystal grain size of 20 nm or more and 50 nm or less.

In one embodiment of the invention, the first transparent conductive layer has a crystal grain size of 20 nm or more and 40 nm or less.

According to still another aspect of the invention, a display device includes any of the above-described electrode substrates.

Thus, the invention described herein makes possible the advantages of providing a method for producing an electrode substrate by which a transparent conductive layer in contact with on an organic insulating layer formed of an organic insulating material and a transparent conductive layer in contact with an inorganic insulating layer formed of an inorganic insulating material can be etched in substantially simultaneously, an electrode substrate produced by such a method, and a display device including such an electrode substrate. The above-described method is realized by performing (1) plasma treatment performed before the transparent conductive layer is formed, (2) control of the crystal grain size of the transparent conductive layer, (3) heat-treatment (i.e., annealing) of the transparent conductive layer, and (4) a combination of at least two of (1) through (3).

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 11:
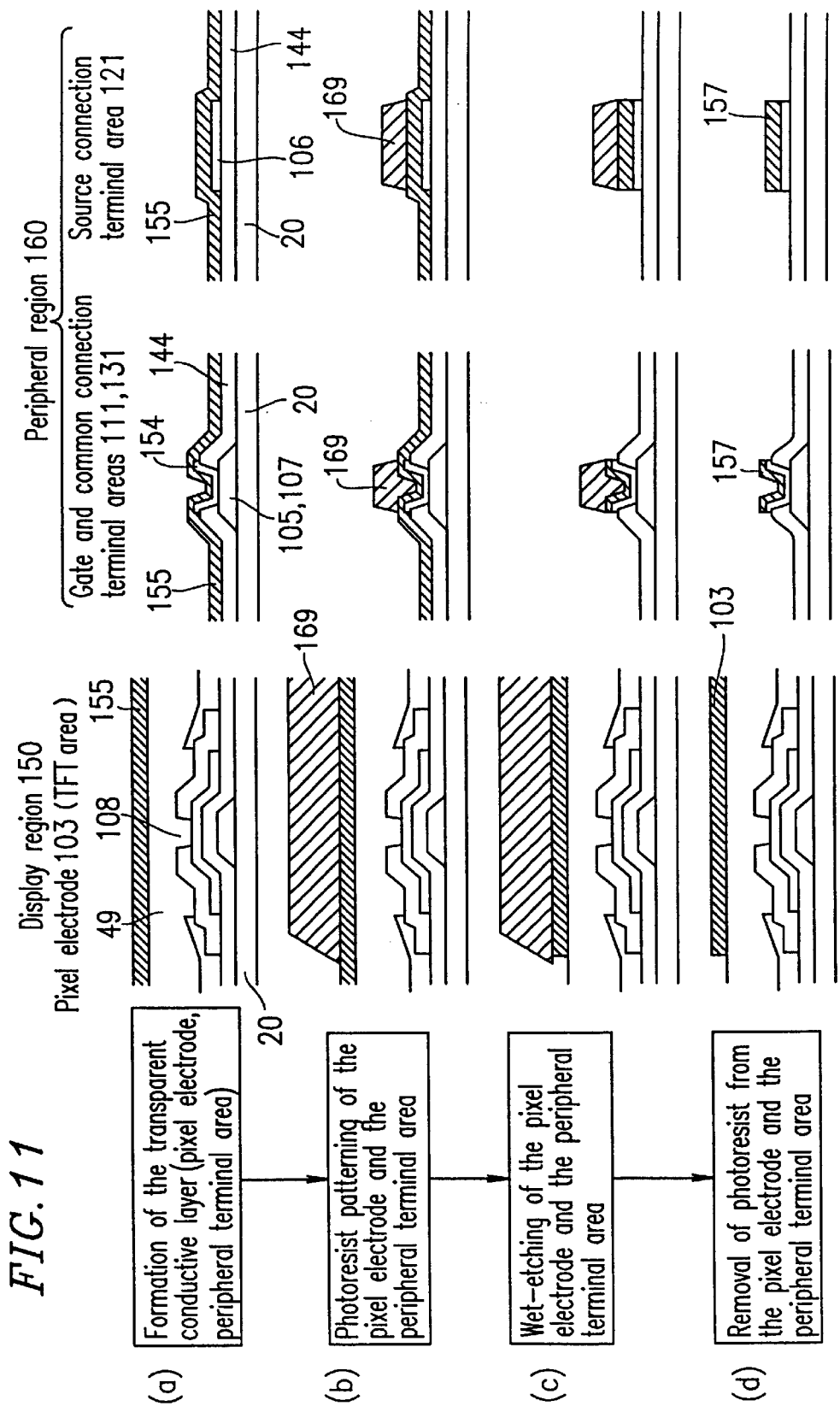
FIG. 11 shows a method for forming a pixel electrode and a transparent electrode of the electrode substrate according to the present invention.
Figure 18:
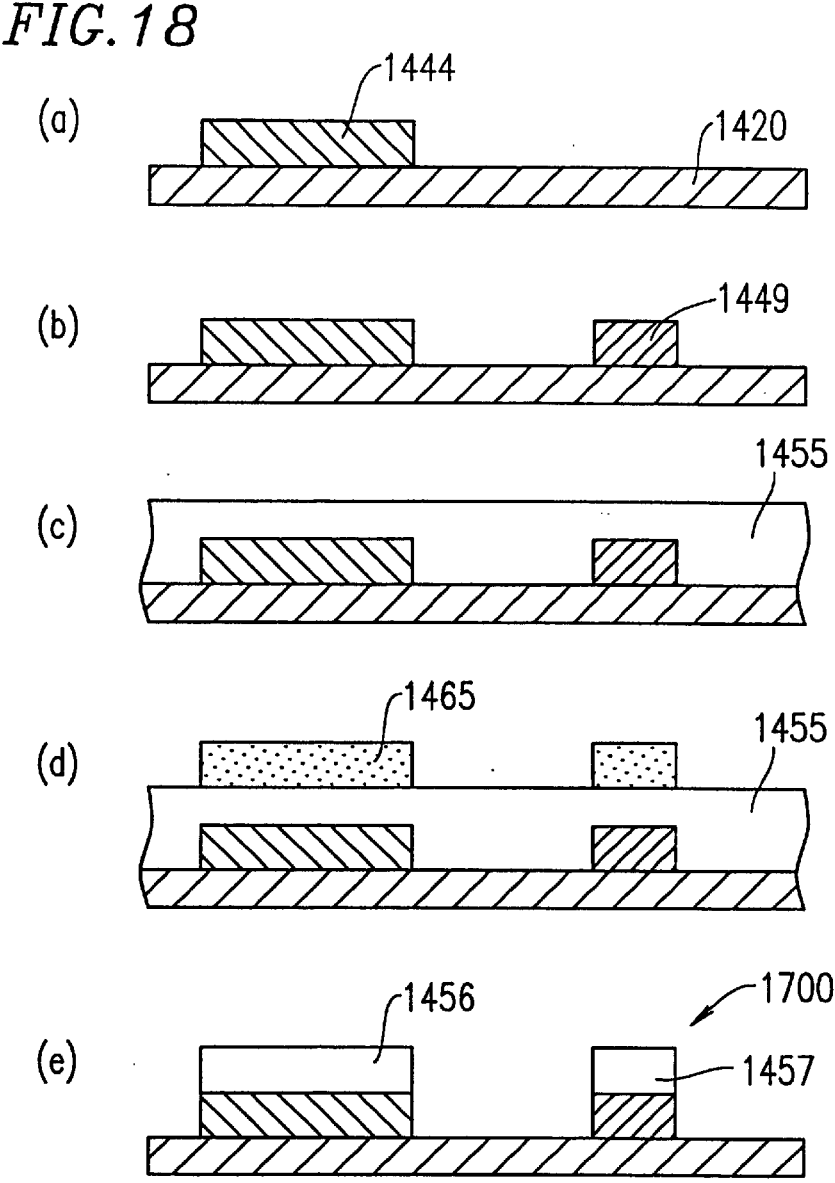
FIG. 18 shows a method for producing an electrode substrate according to an embodiment of the present invention.
Figure 19:
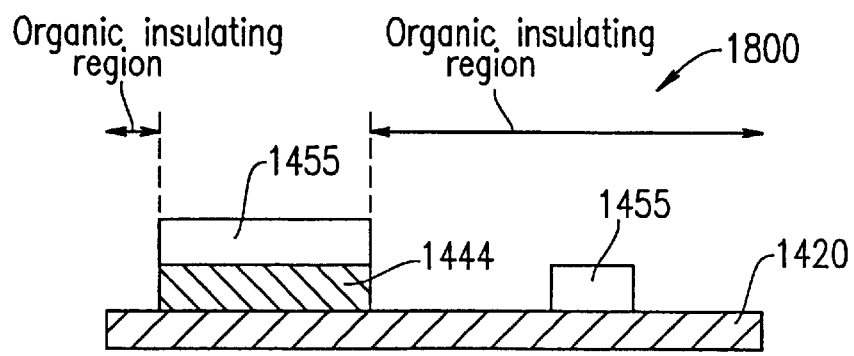
FIG. 19 shows an electrode substrate according to anther embodiment of the present invention.

In this specification, the term "organic insulating region" refers to a region where, for example, an organic insulating layer 49 shown in FIG. 11 or an organic insulating layer 1449 shown in FIG. 18 are provided as a layer in contact with a transparent conductive layer, or a region where an inorganic insulating layer is not provided in a plastic substrate 1420 shown in FIG. 19. The term "inorganic insulating region" refers to a region where, for example, an inorganic insulating layer 144 shown in FIG. 11 or an organic insulating layer 1444 shown in FIGS. 18 and 19 are provided as a layer in contact with a transparent conductive layer.

(1) Plasma Treatment Performed Before a Transparent Conductive Layer is Formed

Figure 7:
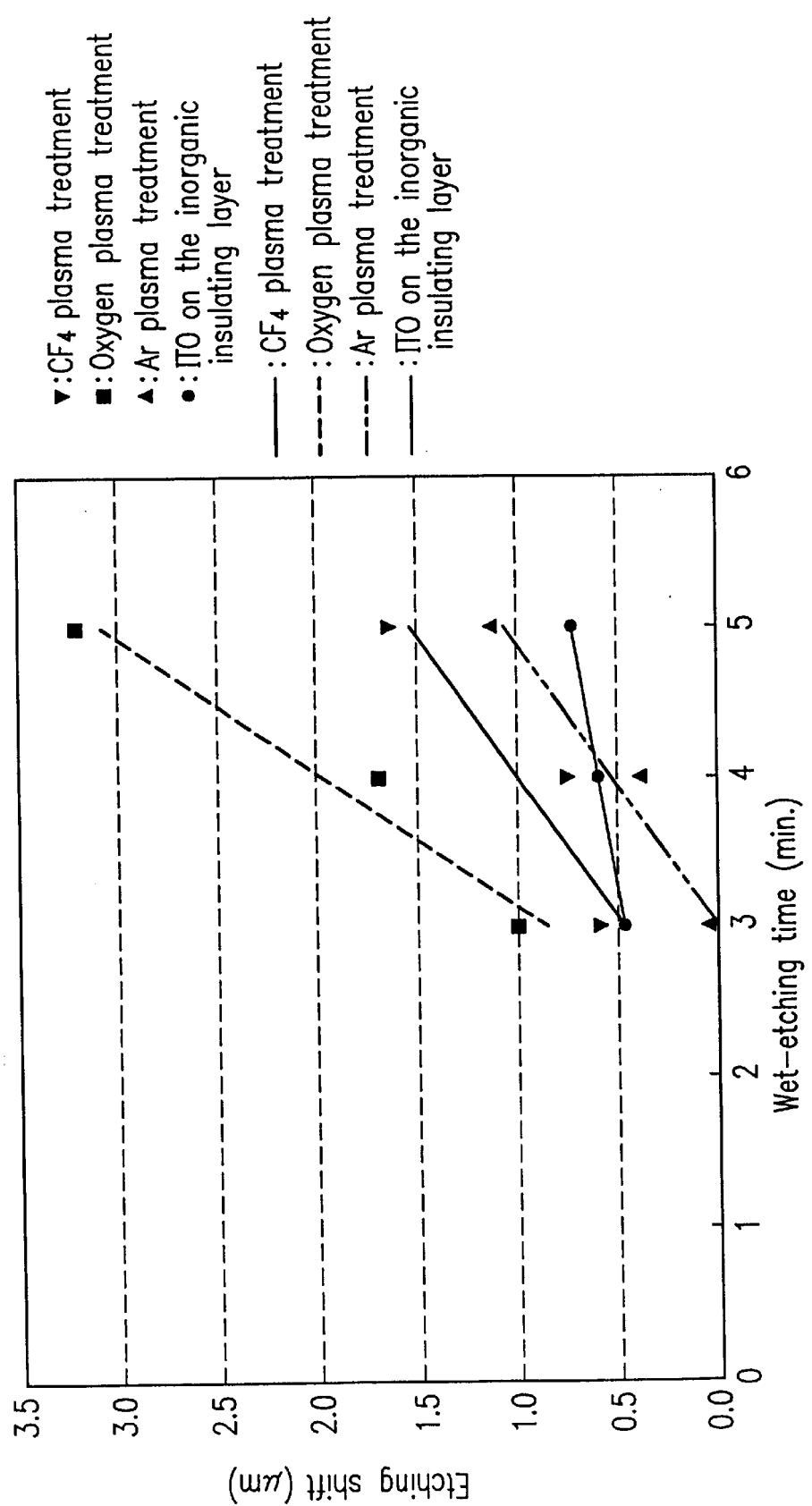
FIG. 7 is a graph illustrating the relationship between the wet-etching time and the etching shift of a transparent conductive layer on an organic insulating layer and a transparent conductive layer on the inorganic insulating layer.

FIG. 7 is a graph illustrating the relationship between the wet-etching time (minutes) and the etching shift ($\mu$m) when the resultant laminate is entirely treated with plasma before a transparent conductive layer is formed. $CF_4$, oxygen and Ar are used as plasma gases. The transparent conductive layer is formed of ITO. In FIG. 7, the results obtained from the transparent conductive layer provided on the organic insulating layer when plasma treatment is performed with $CF_4$, oxygen and Ar are indicated by ▼, ■, and ▲. The linear interpolations thereof are indicated by a thick solid line, a dashed line, and a chain line, respectively. The results obtained from the transparent conductive layer provided on the inorganic insulating layer is indicated by ●, and the linear interpolation thereof is indicated with a thin solid line. In the case of the transparent conductive layer provided on the inorganic insulating layer, the etching shift is not very different whether plasma treatment is performed or not.

When the wet etching time is 3 minutes, the etching shift of the transparent conductive layer on the organic insulating layer is 1.0 μm or less whether $CF_4$, oxygen or Ar is used, which is not very different from the etching shift of the transparent conductive layer on the inorganic insulating layer (about 0.5 μm). Accordingly, any of $CF_4$, oxygen or Ar is usable.

When the wet etching time is relatively long (for example, 5 minutes), the etching shift of the transparent conductive layer on the organic layer significantly increases (about 3.2 μm) when oxygen is used and thus is very different from the etching shift of the transparent conductive layer on the inorganic insulating layer. In this case, simultaneous etching is impossible. When $CF_4$ or Ar is used, the etching shift of the transparent conductive layer on the organic insulating layer is not increased much even when the etching time is 5 minutes, and thus simultaneous etching is possible.

It is appreciated from FIG. 7 that the etching shift of the transparent conductive layer on the inorganic insulating layer does not change with respect to the wet etching time as much as in the case of the transparent conductive layer on the organic insulating layer. In general, the change in the etching shift of a transparent conductive layer on an inorganic insulating layer is smaller than the etching shift of the transparent conductive layer on an organic insulating layer. In the experiment performed by the present inventors, the etching shift of the transparent conductive layer on the inorganic insulating layer is 1.0 μm or less.

Figure 8:
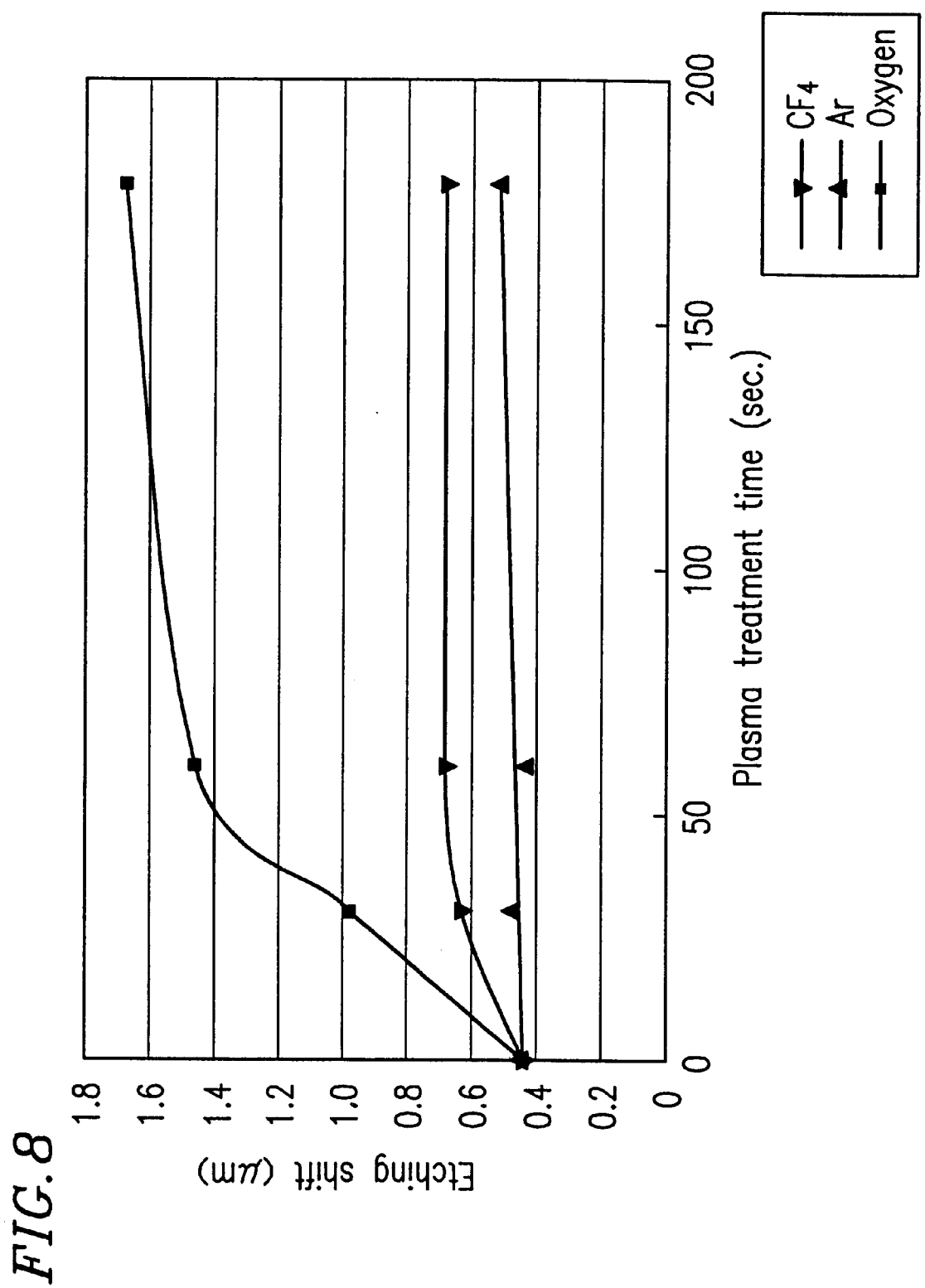
FIG. 8 is a graph illustrating the relationship between the plasma treatment time and the etching shift of a transparent conductive layer on an organic insulating layer.

FIG. 8 shows the relationship between the plasma treatment time (seconds) and the etching shift (μm) of the transparent conductive layer on the organic insulating layer. The results obtained with $CF_4$, oxygen and Ar are indicated by ▼, ■, and ▼. Whichever gas is used, the etching shift increases as the plasma treatment time extends. The increase in the etching shift with respect to the plasma treatment is much larger in the case of oxygen than in the case of $CF_4$ and Ar. When the plasma treatment is about 30 seconds, the etching shift is 1.0 μm or less whether $CF_4$, oxygen or Ar is used, which is not very different from the etching shift of the transparent conductive layer on the inorganic insulating layer. Therefore, the transparent conductive layer on the organic insulating layer can be etched in the same step with the transparent conductive layer on the inorganic insulating layer. When the plasma treatment extends, the transparent conductive layer on the organic insulating layer treated with oxygen cannot be etched in the same step with the transparent conductive layer on the inorganic insulating layer.

Figure 9:
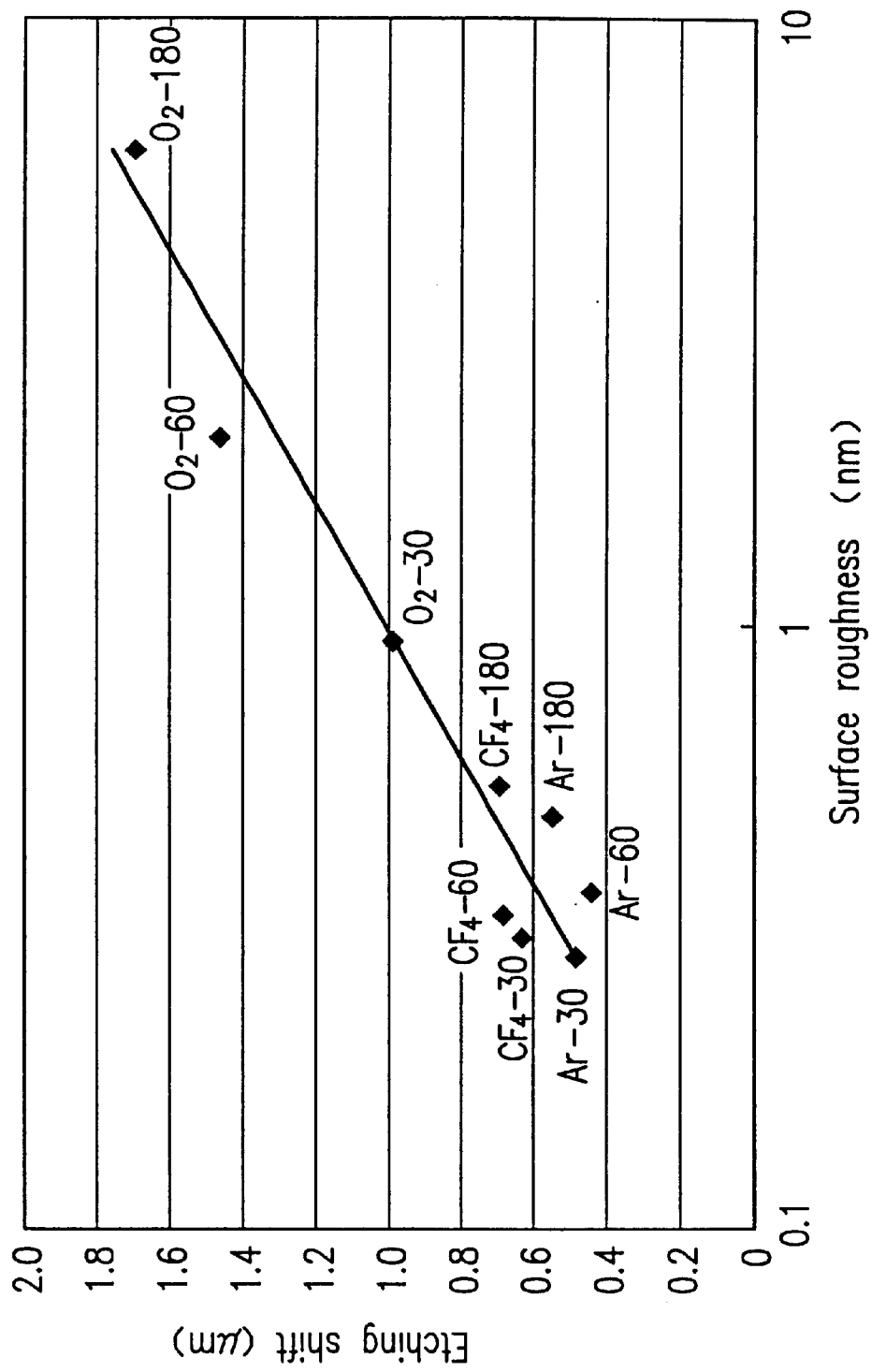
FIG. 9 is a graph illustrating the relationship between the surface roughness of an organic insulating layer and the etching shift of a transparent conductive layer on the organic insulating layer.

FIG. 9 is a graph illustrating the relationship between the root-mean-square (RMS) of the surface roughness (nm) of the organic insulating layer caused by the plasma treatment and the etching shift (μm) of the transparent conductive layer formed thereon. In FIG. 9, "$O_2$-180" indicates that plasma treatment was performed with oxygen for 180 seconds, and "Ar-30" indicates that plasma treatment is performed with Ar for 30 seconds. The wet-etching time is 180 seconds. The surface roughness is measured by a SPA500 produced by Seiko Instruments, Inc. The measurement was performed in a tapping mode (DFM: design for manufacturability) with the strength of cantilever of 20 N/M.

As can be appreciated from FIG. 9, the etching shift increases as the RMS of the surface roughness of the organic insulating layer increases regardless of the type of plasma treatment gas. When the RMS is 1.0 nm or less, the etching shift can be suppressed to 1.0 μm or less, which is close to the etching shift of the transparent conductive layer on the inorganic insulating layer with the wet-etching time of 180 seconds. Thus, the transparent conductive layer on the organic insulating layer and the transparent conductive layer on the inorganic insulating layer can be etched in the same step.

It has also been confirmed that the electric connection between the pixel electrode 103 formed of the transparent conductive layer and the connection electrode 48 is improved when the plasma treatment is performed with Ar for 30 seconds. The RMS of the surface roughness under this condition is 0.28 nm.

The etching shift of the transparent conductive layer is further reduced by heat-treating (at a temperature of, for example, 150° C. or more and 220° or less, and more preferably 200° C. or more and 220° C. or less) the transparent conductive layer which is formed after plasma treatment. For example, when the transparent conductive layer formed on the organic insulating layer is plasma-treated with Ar and heat-treated, the etching shift is reduced by about 0.15 μm than in the case where no heat treatment is performed. When the transparent conductive layer formed on the organic insulating layer plasma-treated with $CF_4$ is heat-treated, the etching shift is reduced by about 0.05 μm than in the case where no heat treatment is performed.

As shown in FIGS. 7 and 8, the etching shift increases as the wet-etching time and the plasma treatment time increase. Accordingly, it is preferable to heat-treat the transparent conductive layer formed on the plasma-treated organic insulating layer in order to reduce the etching shift.

An example of a liquid crystal display device including an electrode substrate according to the present invention will be described in comparison with a liquid crystal display device including a conventional electrode substrate. The liquid crystal display device is merely an example of a device to which the present invention is applicable. The present invention is applicable to any device including an electrode substrate having a transparent conductive layer both on an organic insulating layer and an inorganic insulating layer. For example, the present invention is applicable to an electroluminescence device including a transparent conductive layer as a positive electrode on a substrate formed on an organic insulating member in a light emission region and also including a transparent conductive layer on an inorganic insulating member in a terminal region.

Figure 10:
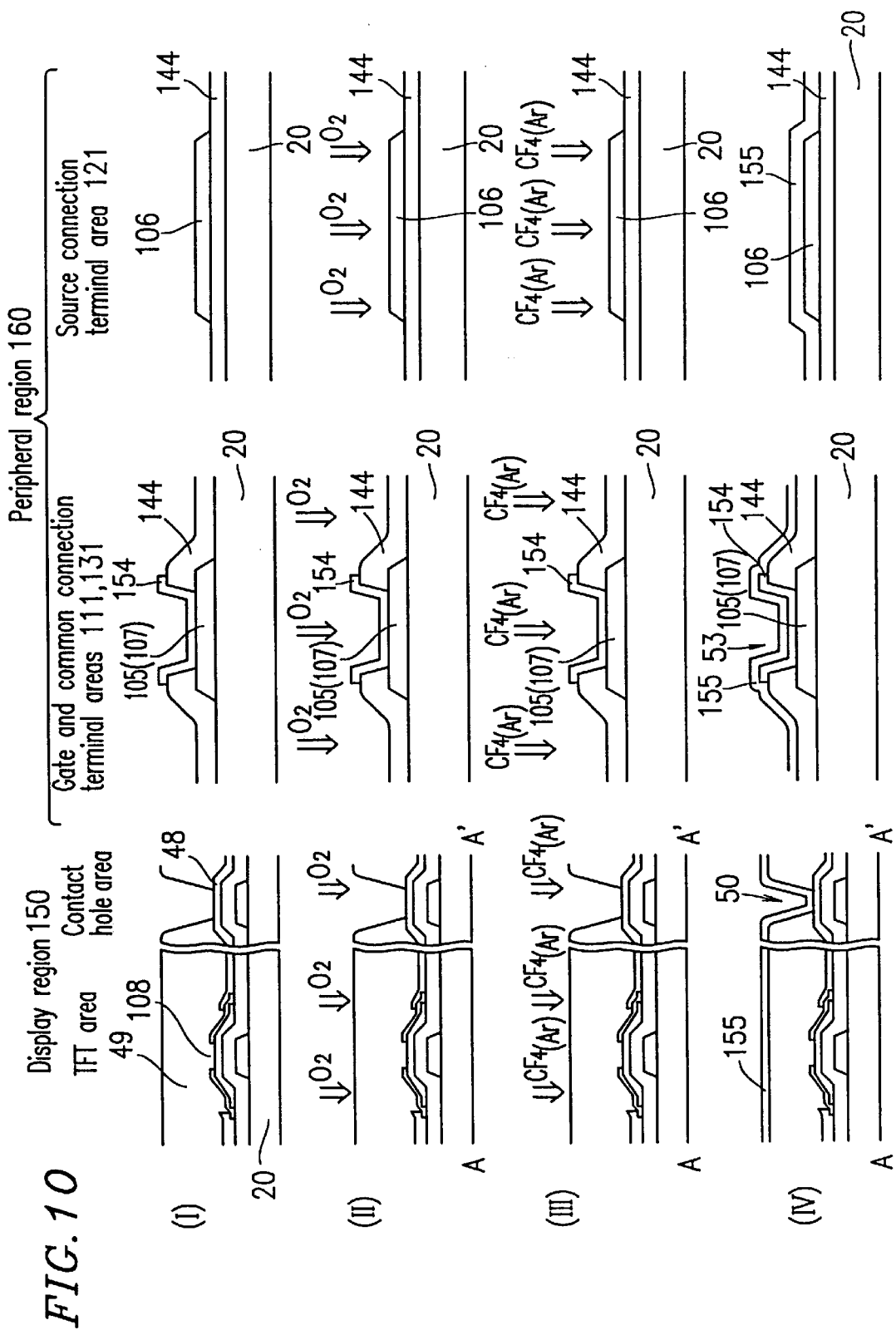
FIG. 10 shows a process of plasma treatment and formation of a transparent conductive layer according to the present invention.

FIG. 10 shows a process of plasma treatment and formation of a transparent conductive layer in the display region 150 and the peripheral region 160 (gate connection terminal area 110, the source connection terminal area 121 and the common connection terminal area 131) according to the present invention. The same reference numerals as those of the electrode substrate 101 shown in FIGS. 1 through 6 are used for the sake of convenience.

Figure 1:
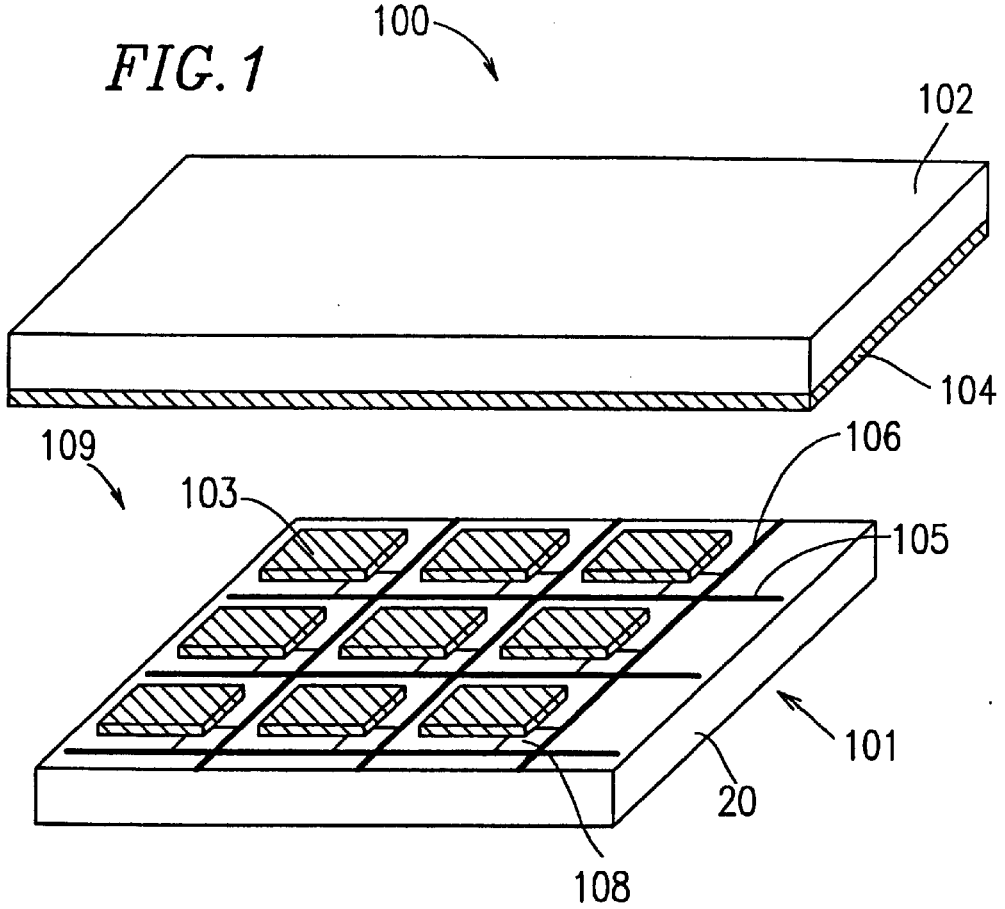
FIG. 1 is a schematic isometric view illustrating a basic structure of a liquid crystal display device.
Figure 2:
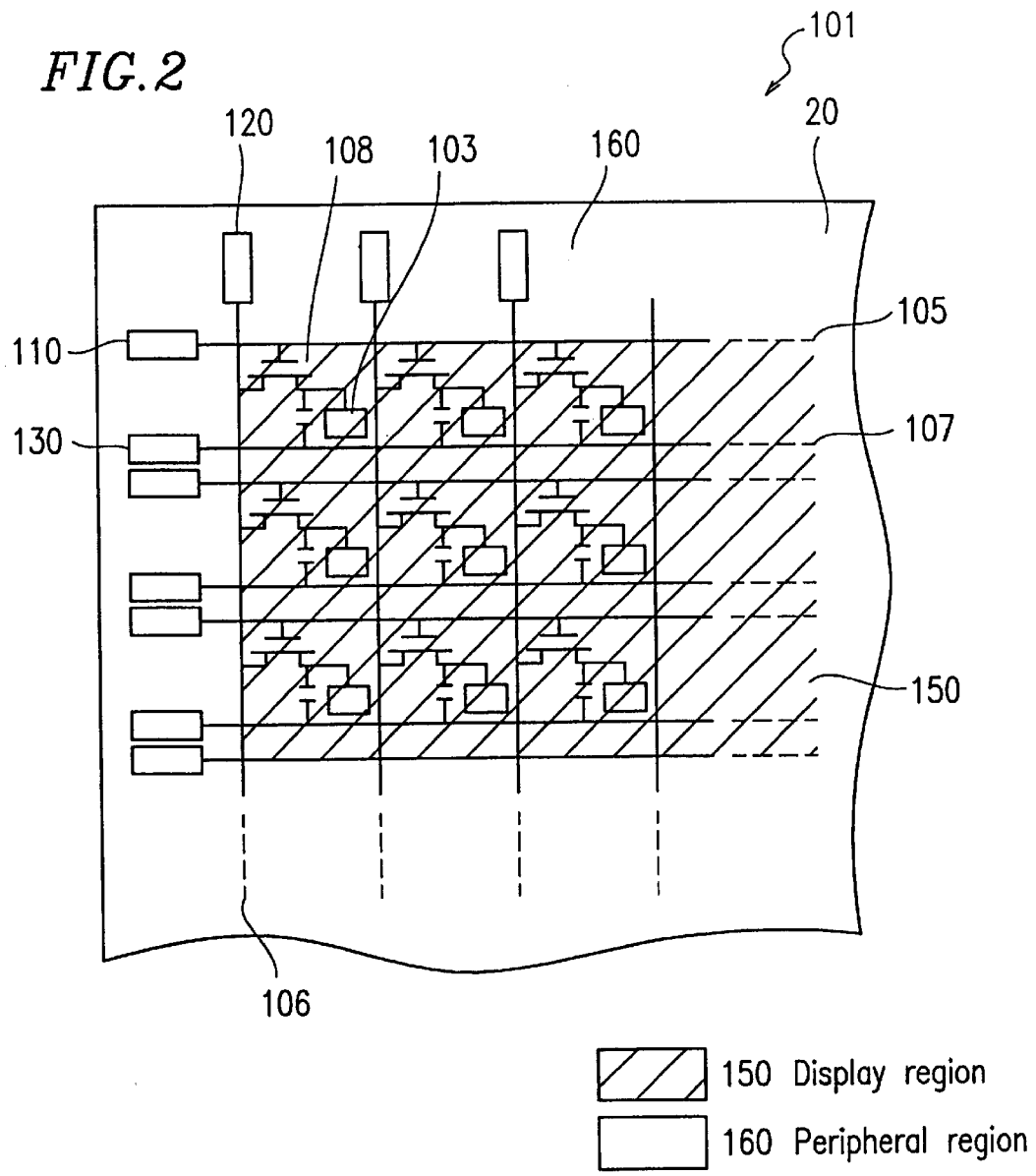
FIG. 2 is a plan view of an electrode substrate of the liquid crystal display device shown in FIG. 1.
Figure 3:
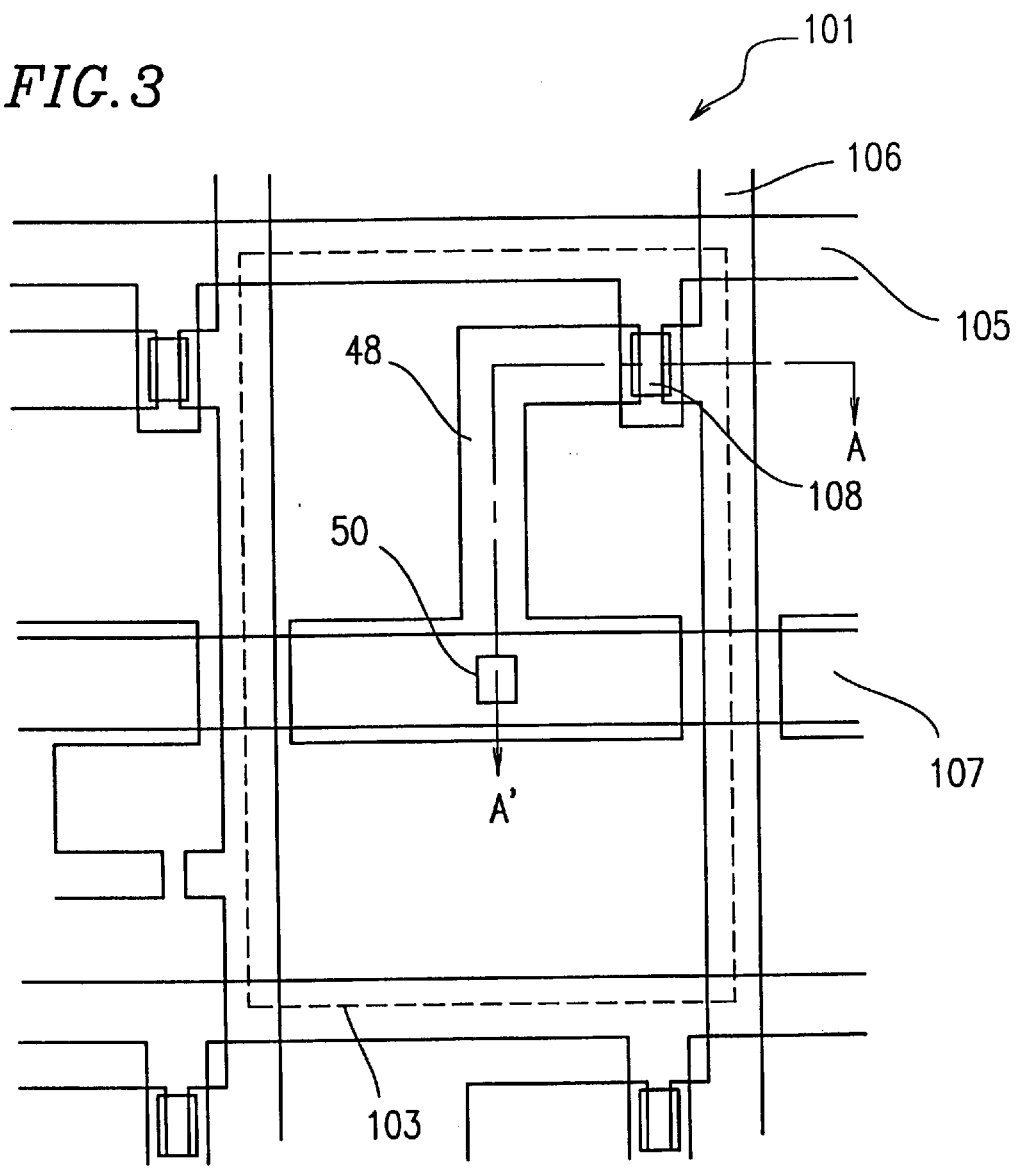
FIG. 3 is an enlarged view of FIG. 2.
Figure 4:
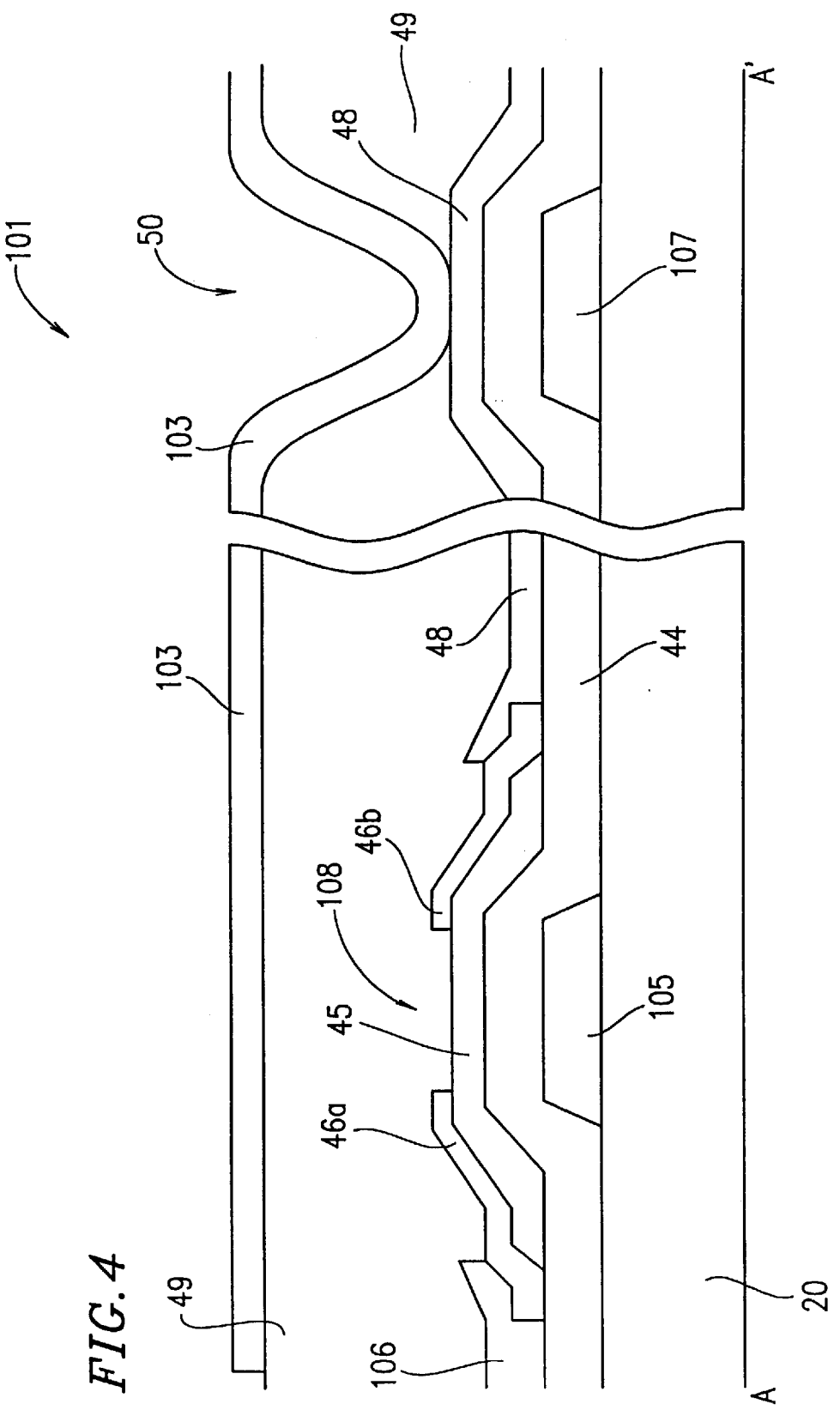
FIG. 4 is a cross-sectional view along line A–A' of FIG. 3.
Figure 5:
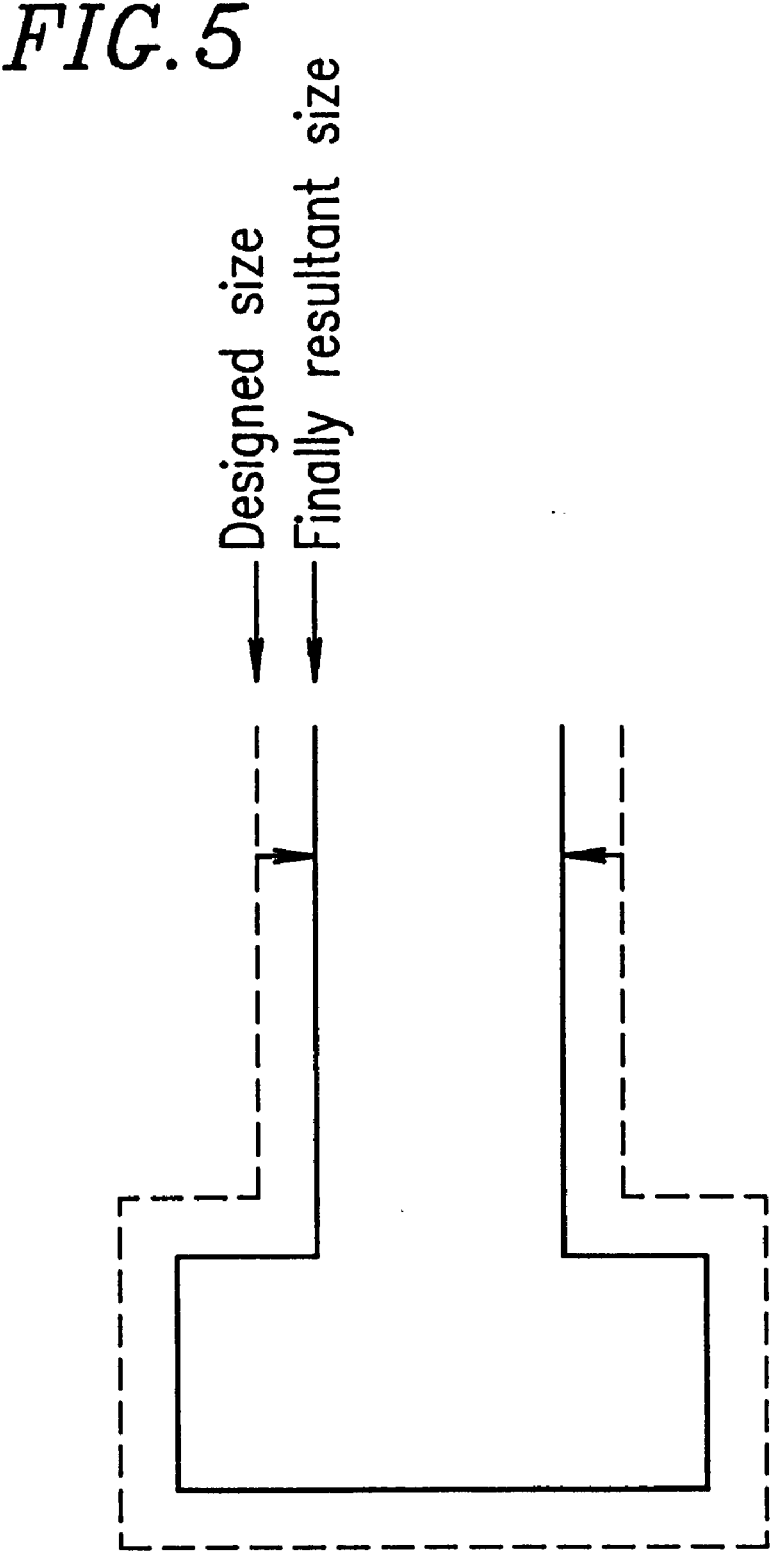
FIG. 5 shows the difference of a designed size of a layer and a finally resulting size of a layer.

The display region 150 includes the TFT area (left portion of parts (I) through (IV) of FIG. 10) and the contact hole area (right portion of parts (I) through (IV) of FIG. 10) as in FIG. 4.

In step (I) of FIG. 10, an organic insulating layer 49 is formed so as to cover the TFT 108, and a part of the organic insulating layer 49 is removed for forming the contact hole 50 in the contact hole area.

In each of the gate and common connection terminal areas 111 and 131 of the peripheral region 160, the gate line 105 or the common line 107 is formed on the insulating plate 20.

An inorganic insulating layer 144 is formed on the gate line 105 or the common line 107, although the inorganic insulating layer 144 is not provided on the center of the gate line 105 or the common line 107. On the center of the gate line 105 or the common line 107, an electrode 154 is formed.

In the source connection terminal area 121, an inorganic insulating layer 144 is formed on the insulating plate 20, and the source line 106 is formed on the inorganic insulating layer 144.

The organic insulating layer 49 formed in the display region 150 is formed of, for example, a photosensitive resin. The organic insulating layer 49 is applied by a spin-coating method, next is exposed by a photolithography method, and then is developed with an alkaline solution. Thus, a part of the organic insulating layer 49 is removed so as to expose the connection electrode 48, thereby forming the contact hole 50. Then, the organic insulating layer 49 is heat-treated at 200° C. to be cured.

In step (II), the display region 150, and the gate connection terminal area 111, the common connection terminal area 131, and the source connection terminal area 121 are plasma-treated with oxygen. The plasma treatment is performed, for example, at 9000 sccm and 3000 mTorr for 30 seconds.

In step (III), the display region 150, and the gate connection terminal area 111, the common connection terminal area 131, and the source connection terminal area 121 are plasma-treated with $CF_4$ or Ar.

The plasma treatment with $CF_4$ is performed, for example, in a $CF_4$ atmosphere of 400 sccm and 70 mTorr for 30 seconds at a power of 1000 W. The plasma treatment with Ar is performed, for example, in an Ar atmosphere of 290 sccm and 1.7 Pa for 30 seconds at an RF power of 1.0 kW.

In step (IV), a transparent conductive layer 155 to become a pixel electrode 103 or a transparent electrode 157 is formed on the resultant laminates in the display region 150 and the peripheral region 160. When the organic insulating layer 49 is formed of an acrylic resin, the transparent conductive layer 155 is formed at 200° C. so as not to make the acrylic resin brittle by heat. Even when the organic insulating layer 49 is formed of another material, it is preferable to form the transparent conductive layer 155 at a similar temperature. The formation of the transparent conductive layer 155 is performed, for example, using a single-substrate type sputtering apparatus to a thickness of 80 to 120 nm. Under one example of the layer formation conditions, the layer formation is conducted using a mixture gas of $O_2$ and Ar as a sputtering gas and using $In_2O_3$ (containing 5% to 10% of $SnO_2$) as a target, at a gas flow rate of 100 sccm, a gas pressure of 0.7 Pa, and a power of 1.3 kW.

In the process shown in FIG. 10, plasma treatment with oxygen (step (II)) is followed by plasma treatment with $CF_4$ or Ar (step (III)). As described above, only plasma treatment with oxygen may be performed. Namely, step (II) may be immediately followed by step (IV) without performing step (III). Alternatively, only plasma treatment with $CF_4$ or Ar may be performed. Namely, step (I) may be immediately followed by step (III) without performing step (II).

It should be noted, though, that plasma treatment with oxygen (step (II)) reduces the contact resistance at the contact hole 50. The reason is that plasma treatment with oxygen effectively removes the residue in the contact hole 50, the materials still remaining after etching, etc.

By performing the plasma treatment as described above, the transparent conductive layer 155 is formed on the organic insulating layer 49 and on the inorganic insulating layer 144 as shown in FIG. 11 (part (a)).

With reference to FIG. 11, a method for forming the pixel electrode 103 and the transparent electrode 157 will be described. In FIG. 11, in the portion of the display region 150, only the TFT area is shown.

After the transparent conductive layer 155 is heat-treated, further heat treatment may be performed.

After the transparent conductive layer 155 is formed as shown in step (a), photoresist patterning is performed in step (b) in the TFT area and the peripheral region 160 as follows. First, a first photoresist layer 169 is formed on an area of the transparent conductive layer 155, which is to be left (i.e., the area to become the pixel electrode 103 or a transparent conductive layer 157). The first photoresist layer 169 is formed of a positive resist, for example, of a novolac resin available from Tokyo Ohka Kogyo Co., Ltd.

In step (c), the transparent conductive layer 155 is removed by wet-etching except for the area covered with the first photoresist layer 169 in each of the display region 150 and the peripheral region 160. The wet-etching is performed, for example, using a ferric chloride solution which is a mixture of $FeCl_3$ and HCl, having a temperature of 40° C., as a wet-etchant for 180 seconds.

In step (d), the first photoresist layer 169 is removed. As a result, the pixel electrode 103 and the transparent electrode 157, both formed of the transparent conductive layer 155, are respectively formed in the display region 150 and the peripheral region 160.

Figure 6:
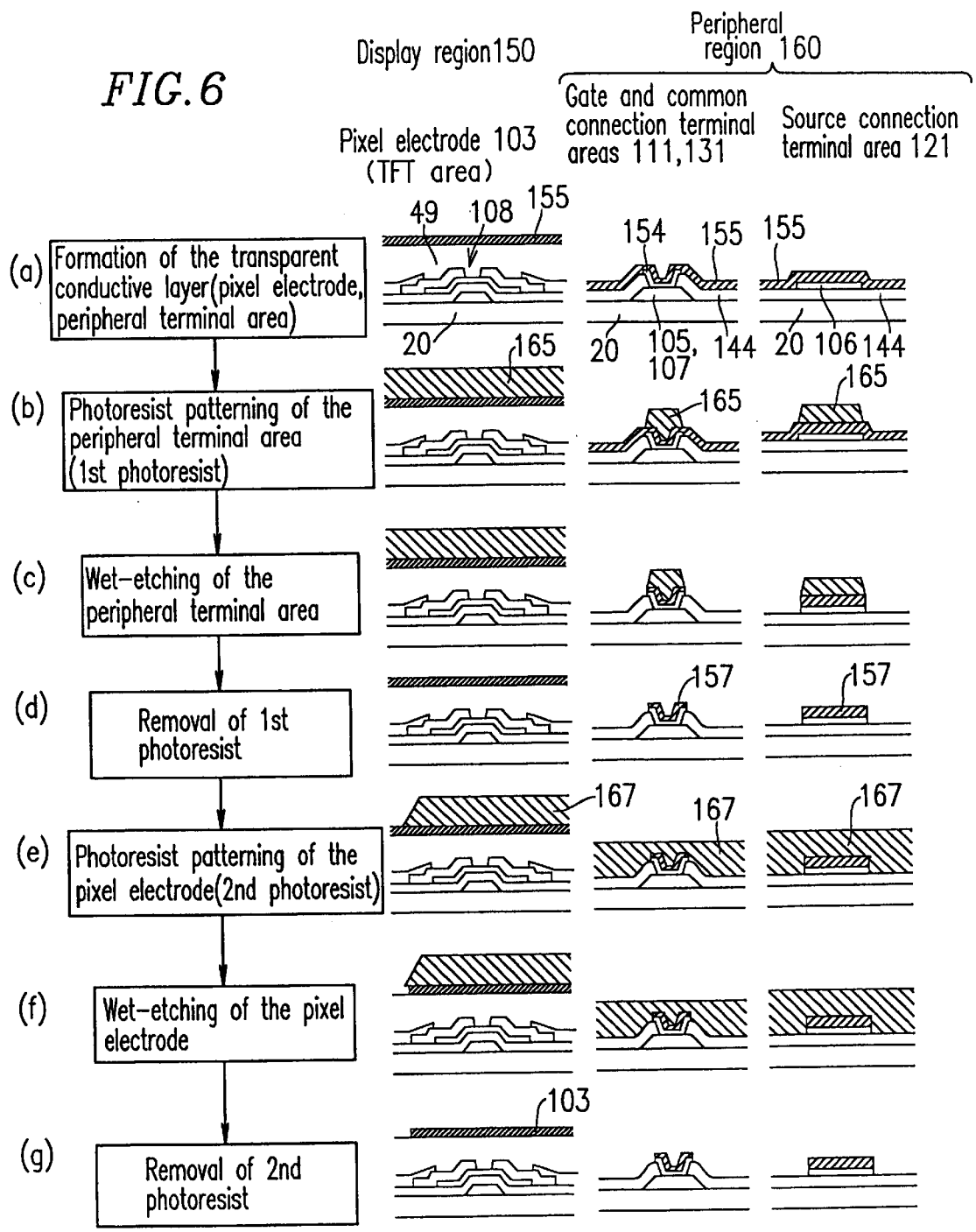
FIG. 6 shows a conventional method for producing an electrode substrate.

According to the present invention, steps (b) through (d) and steps (e) through (g) shown in FIG. 6 can be substantially in the same step performed. Thus, the production process is shortened, resulting in reduced production cost and improved production ability. Additionally, since the number of photoresist patterning steps is lowered, a reduction in the yield due to patterning defect can be avoided. The amount of required photoresist and a photoresist removing solution is reduced. Since the number of times that the organic insulating layer is immersed in the photoresist removing solution is reduced, the swelling of the organic insulating layer can be minimized, as a result of which the reliability of the liquid crystal display device is improved.

In the case where the transparent conductive layer 155 is formed after the electrode 154 is plasma-treated the gate and common connection terminal areas 111 and 131, the contact resistance between the electrode 154 and the transparent conductive layer 155 (to become the transparent electrode 157) is reduced.

Figure 12:
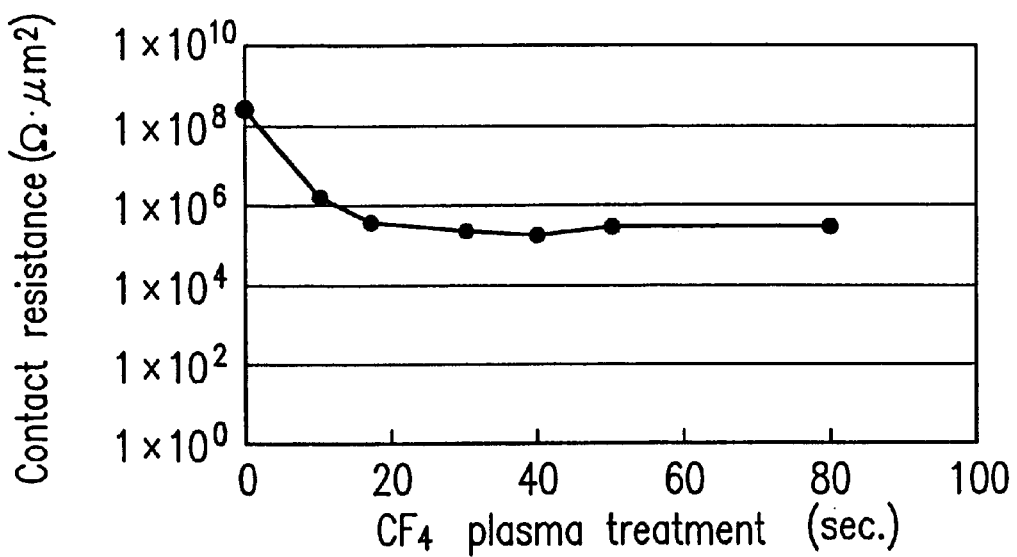
FIG. 12 is a graph illustrating the relationship between the $CF_4$ plasma treatment time and the contact resistance of the electrodes formed of a transparent conductive layer on an organic insulating layer and a transparent conductive layer formed on an inorganic insulating layer.

FIG. 12 is a graph illustrating the relationship between the $CF_4$ plasma treatment time and the contact resistance of the electrode 154 and the transparent conductive layer 155 (to become the transparent electrode 157) in the gate and common connection terminal areas 111 and 131. It is appreciated from FIG. 12, the contact resistance is reduced by three orders in magnitude to provide a stable contact resistance by performing $CF_4$ plasma treatment for 30 seconds or more. The same effect is provided by plasma treatment with oxygen or Ar.

By performing the above-describe heat treatment after the transparent conductive layer 155 (to become the transparent electrode 157) is formed, the crystallinity of the transparent conductive layer 155 is improved and thus the resistance of the transparent electrode 157 in the inorganic insulating layer 144 is reduced. As a result, the line resistance on the inorganic insulating layer 144 is also reduced.

Figure 13:
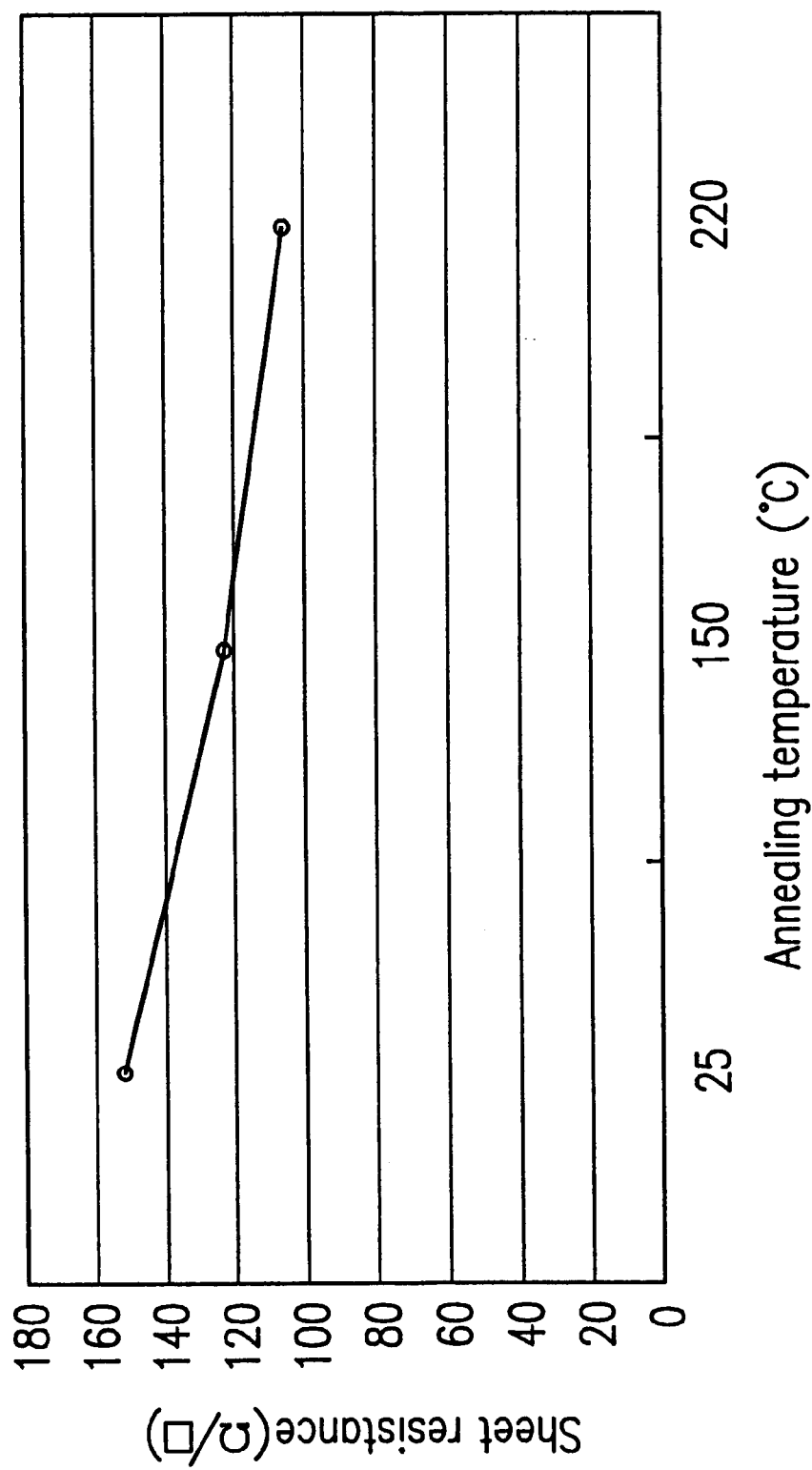
FIG. 13 is a graph illustrating the relationship between the annealing temperature of the transparent conductive layer and the sheet resistance.

FIG. 13 is a graph illustrating the relationship between the annealing (heat-treatment) temperature (° C.) performed after the transparent conductive layer 155 is formed and the resistance per unit area (sheet resistance) ($\Omega/\square$) of the transparent electrode 157. It is appreciated from FIG. 13 that the sheet resistance is reduced by heat-treatment.

In the case where $CF_4$ or Ar plasma treatment is performed as in this example, the gas used for the plasma treatment mixed in a surface layer of the organic insulating layer 49 can be specified by performing component analysis using an XPS (x-ray photoelectron spectroscopy) apparatus or other analyzers.

(2) Control of the Crystal Grain Size of the Transparent Conductive Layer

The etching shift of the transparent conductive layer on the organic insulating layer can be made closer to the etching shift of the transparent conductive layer on the inorganic insulating layer by controlling the crystal grain size of the transparent conductive layer.

Figure 14:
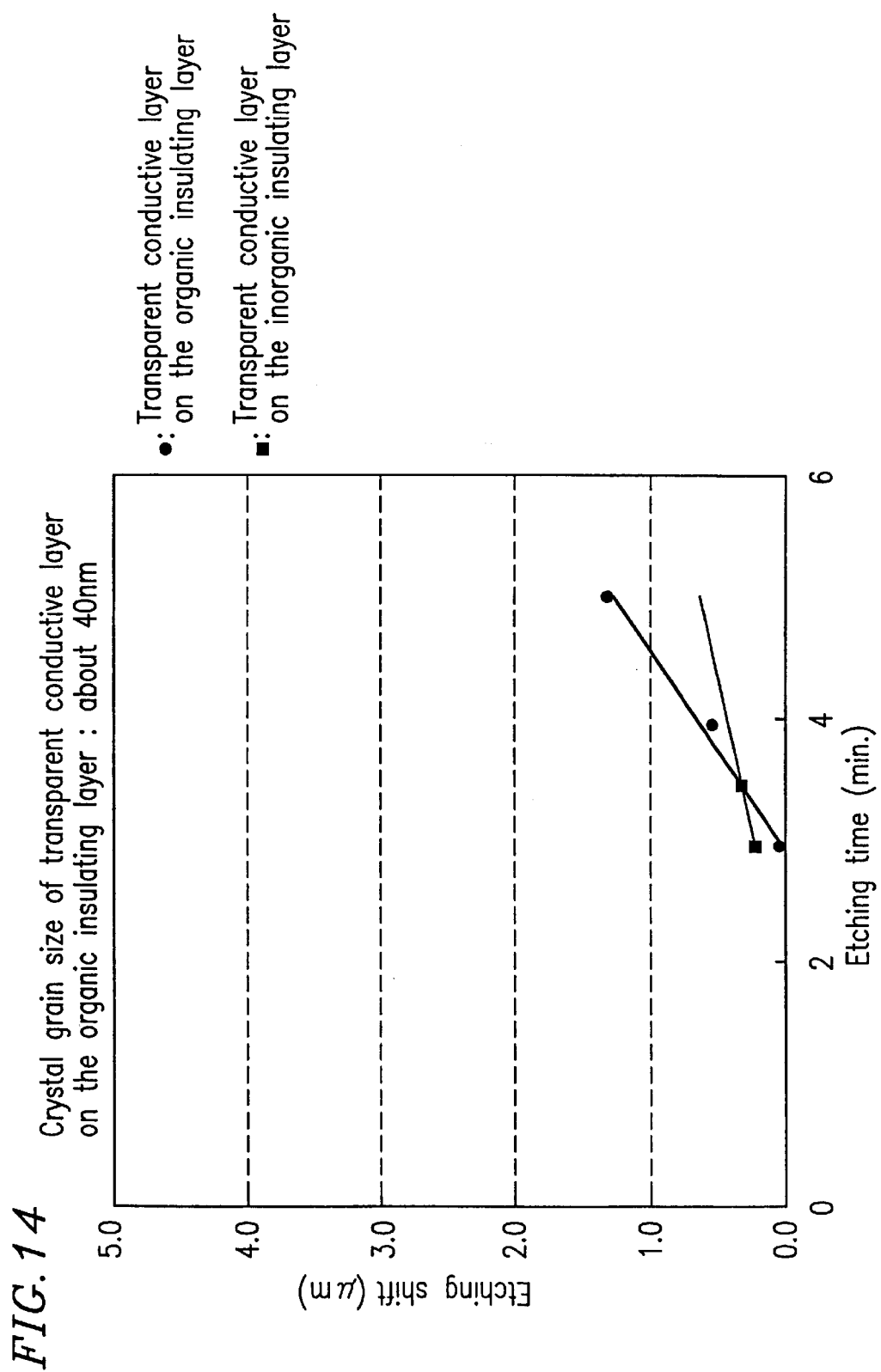
FIG. 14 is a graph illustrating the relationship between the wet-etching time and the etching shift of a transparent conductive layer on an organic insulating layer and a transparent conductive layer on an inorganic insulating layer when the crystal grain size of the transparent conductive layer on the organic insulating layer is about 40 nm.

FIG. 14 is a graph illustrating the relationship between the wet-etching time (minutes) and the etching shift ($\mu$m) of the transparent conductive layer when the crystal grain size of transparent conductive layer on the organic insulating layer is about 40 nm. In FIG. 14, the results obtained from the transparent conductive layer provided on the organic insulating layer are indicated by ●, and the results obtained from the transparent conductive layer provided on the inorganic insulating layer are indicated by ■. The linear interpolations thereof are respectively indicated by a thick solid line and a thin solid line. The organic insulating layer is formed of an acrylic resin, the transparent conductive layer is formed of ITO, and the inorganic insulating layer is formed of $SiN_x$.

As shown in FIG. 14, when the wet-etching time is 3 to 5 minutes, the etching shift of the transparent conductive layer on the organic insulating layer is smaller than 1.5 $\mu$m and the etching shift of the transparent conductive layer on the inorganic insulating layer is smaller than 1.0 $\mu$m. Since the difference between the etching shifts of the two transparent conductive layers is relatively small, the two transparent conductive layers can be etched in the same step.

FIG. 14 shows the results when the crystal grain size of the transparent conductive layer on the organic insulating layer is about 40 nm. As long as the crystal grain size of the transparent conductive layer on the organic insulating layer is in the range of 20 nm to 50 nm, the difference between the transparent conductive layer on the organic insulating layer and the transparent conductive layer on the inorganic insulating layer is similarly small, and thus the two transparent conductive layers can be etched in the same step.

Figure 15:
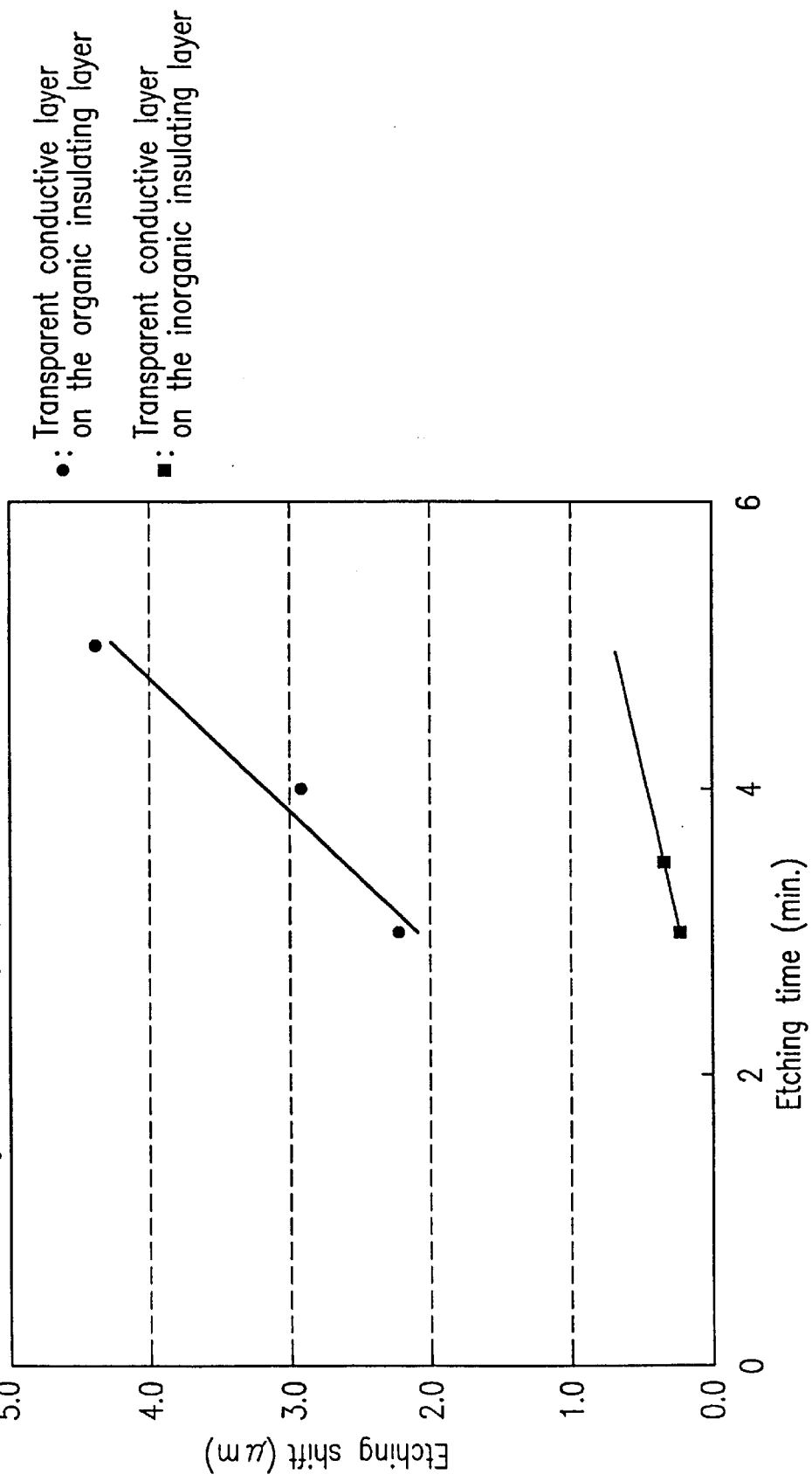
FIG. 15 is a graph illustrating the relationship between the wet-etching time and the etching shift of a transparent conductive layer on an organic insulating layer and a transparent conductive layer on an inorganic insulating layer when the crystal grain size of the transparent conductive layer on the organic insulating layer is about 100 nm.

For comparison, FIG. 15 is a graph illustrating the relationship between the wet-etching time (minutes) and the etching shift ($\mu$m) of the transparent conductive layer when the crystal grain size of transparent conductive layer on the organic insulating layer is about 100 nm.

As shown in FIG. 15, when the wet-etching time is 3 to 5 minutes, the etching shift of the transparent conductive layer on the organic insulating layer is 2.0 $\mu$m or more, which is significantly different from the etching shift of the transparent conductive layer on the inorganic insulating layer. In this case, it is impossible to etch the two transparent conductive layers in the same step.

The crystal grain size of the transparent conductive layer on the organic insulating layer can be controlled by, for example, performing plasma treatment before the transparent conductive layer is formed. Oxygen or $CF_4$ plasma treatment performed for an extended period of time roughens the surface of the organic insulating layer and thus tends to increase the crystal grain size of the transparent conductive layer formed thereon. Ar plasma treatment alleviates the surface roughness of the organic insulating layer and thus tends to decrease the crystal grain size of the transparent conductive layer formed thereon.

Figure 16:
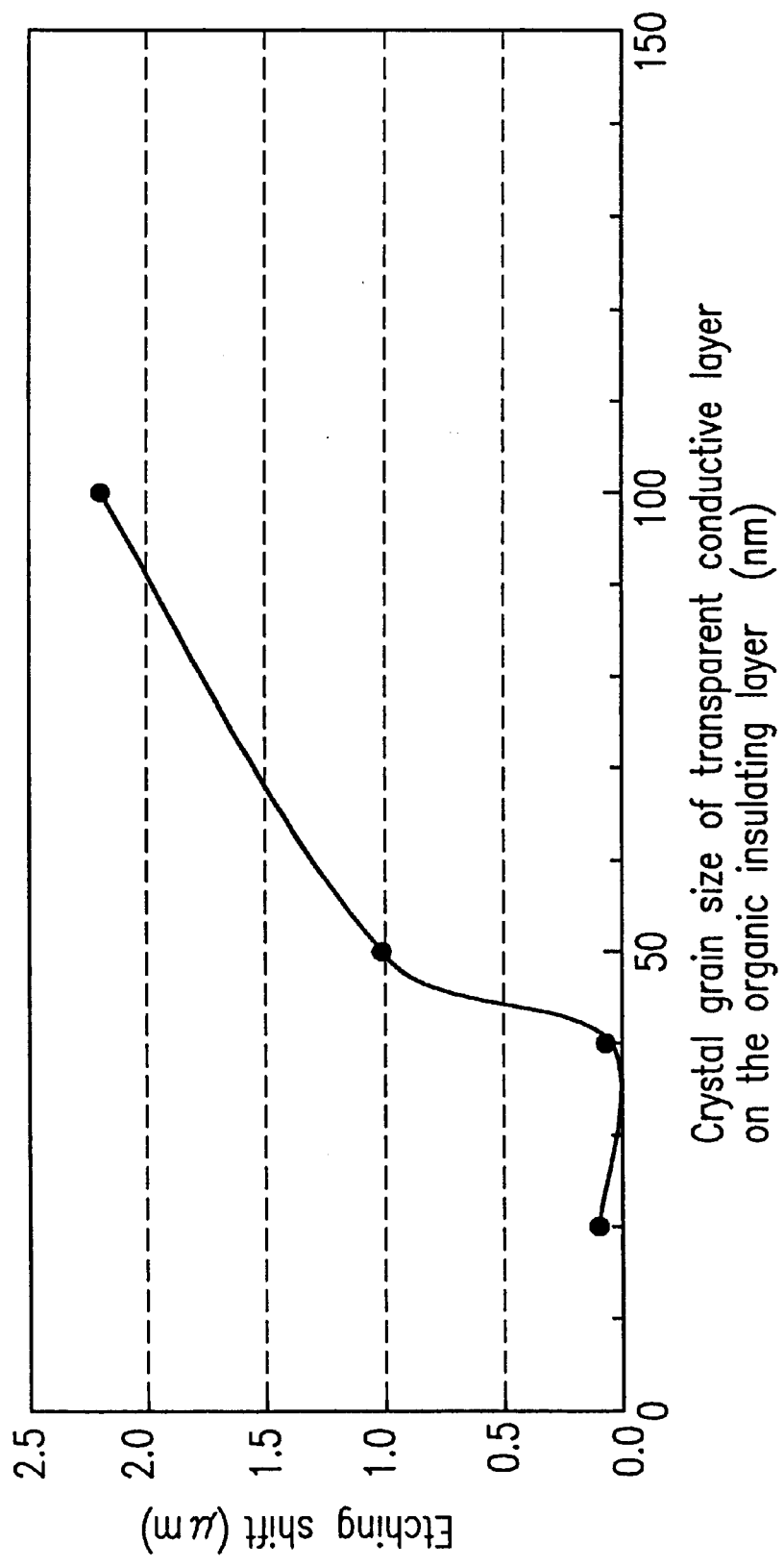
FIG. 16 is a graph illustrating the relationship between the crystal grain size and the etching shift of a transparent conductive layer on an organic insulating layer.

FIG. 16 is a graph illustrating the relationship between the etching shift ($\mu$m) and the crystal grain size of the transparent conductive layer on the organic insulating layer (nm). The organic insulating layer is formed of an acrylic resin, the transparent conductive layer is formed of ITO, and the wet-etching time is 3.0 minutes.

As shown in FIG. 16, when the crystal grain size of the transparent conductive layer on the organic insulating layer is 20 nm or more and 50 nm or less, the etching shift is 1.0 $\mu$m or less, which is not very different from the etching shift of the transparent conductive layer on the inorganic insulating layer (about 0.2 $\mu$m, see FIG. 14). Thus, the two transparent conductive layers can be etched in the same step for a prescribed etching time. When the crystal grain size of the transparent conductive layer on the organic insulating layer is 20 nm or more and 50 nm or less, the electric resistance is preferable for an electrode. When the crystal grain size is 20 nm or more and 40 nm or less, the etching shift is smaller and thus improves the controllability of the transparent conductive layer on the organic insulating layer. It has been confirmed by the present inventors that when the crystal grain size is 60 nm or more, the etching shift is significantly increased as shown in FIG. 15 and it is impossible to etch the two transparent conductive layers in the same step due to the excessive difference in the etching shift between the two transparent conductive layers.

When the crystal grain size is less than 20 nm, the electric resistance is excessively raised, which is not suitable for an electrode. Use of an electrode substrate having such a large resistance of the transparent conductive layer is not preferable since the electric resistance of the pixel electrode, the gate connection terminal area, the common connection terminal area, and the source connection terminal area increases. Specifically, an increase in the electric resistance of the gate, common and source connection terminal areas is disadvantageous in producing a high-resolution, large-screen liquid crystal display device.

Referring to FIG. 11, the plasma treatment is performed before the transparent conductive layer 155 is formed on the organic insulating layer 49, in, for example, an Ar gas atmosphere of 290 sccm and 1.7 Pa at an RF power of 1.0 kW for 30 seconds. The transparent conductive layer 155 formed on the organic insulating layer 49 treated with plasma in this manner has a crystal grain size of 20 nm or more and 50 nm or less.

After this, steps (b) through (d) described above with reference to FIG. 11 are performed.

According to the present invention, steps (b) through (d) and steps (e) through (g) shown in FIG. 6 can be substantially in the same step performed. Thus, the production process is shortened, resulting in reduced production cost and improved production ability. Additionally, since the number of photoresist patterning steps is lowered, reduction in the yield due to patterning defect can be avoided. The amount of required photoresist and a photoresist removing solution is reduced. Since the number of times that the organic insulating layer is immersed in the photoresist removing solution is reduced, the swelling of organic insulating layer can be minimized, as a result of which the quality reliability of the liquid crystal display device is improved.

(3) Heat Treatment (Annealing) Performed After the Transparent Conductive Layer is Formed The etching shift of the transparent conductive layer on the organic insulating layer can be made closer to the etching shift of the transparent conductive layer on the inorganic insulating layer by annealing the transparent conductive layer.

Figure 17:
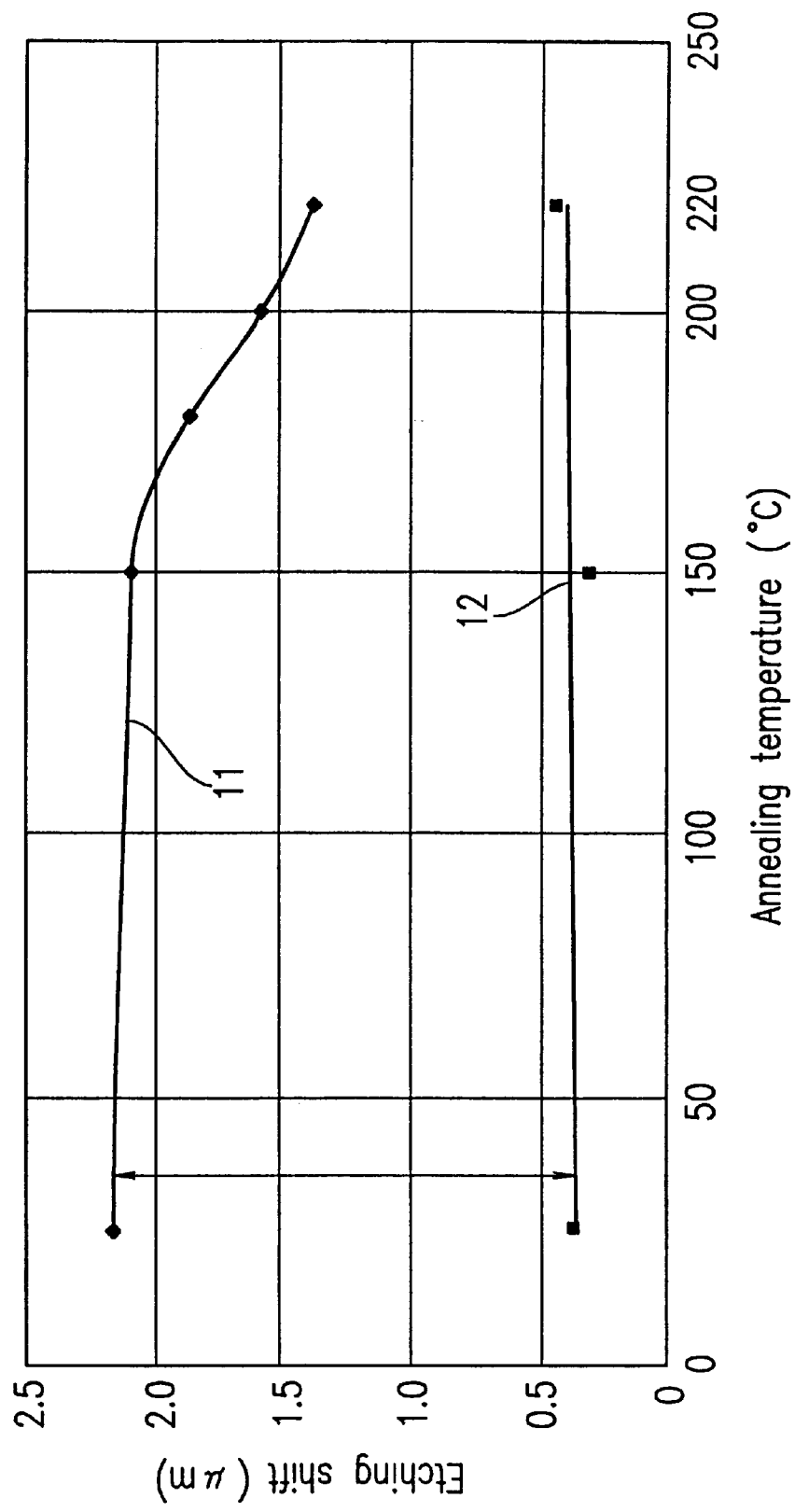
FIG. 17 is a graph illustrating the relationship between the annealing temperature and the etching shift of a transparent conductive layer on an organic insulating layer and a transparent conductive layer on an inorganic insulating layer.

FIG. 17 is a graph illustrating the relationship between the temperature at which annealing is performed for a certain period time (degrees; hereinafter, referred to as an "annealing time") and the etching shift (μm) of the post-annealing transparent conductive layer. In FIG. 17, line 11 indicates the results obtained from the transparent conductive layer on the organic insulating layer, and line 12 indicates the results obtained from the transparent conductive layer on the inorganic insulating layer. The organic insulating layer is formed of an acrylic resin, the inorganic insulating layer is formed of $SiN_x$, and the transparent conductive layer is formed of ITO. The wet-etching is performed using a ferric chloride solution for 180 seconds. The annealing temperature is set to be maintained for 1 hour.

As shown in FIG. 17, the difference between the etching shift of the transparent conductive layer on the organic insulating layer and the transparent conductive layer on the inorganic insulating layer is decreased as the annealing temperature is raised. Especially when the annealing temperature is 150° C. or more and 220° C. or less, the etching shift of the transparent conductive layer on the organic insulating layer is decreased, and as a result the difference between the etching shifts of the two transparent conductive layers is reduced. Therefore, the transparent conductive layer on the organic insulating layer and the transparent conductive layer on the inorganic insulating layer can be etched in the same step. When the annealing temperature is 200° C. or more and 220° C. or less, the etching shift of the transparent conductive layer on the organic insulating layer is still smaller and thus more preferable.

The annealing temperature of higher than 220° C. is not preferable since an organic insulating layer is generally sublimated at a high temperature and thus has an undesirable possibility of adversely influencing the region around the organic insulating layer. Therefore, the upper limit of the annealing temperature is 220° C.

The etching shift is further reduced by at least treating the surface of the organic insulating layer with plasma before forming the transparent conductive layer thereon. Usable gases for plasma treatment include, for example, Ar and $CF_4$.

In the case where $CF_4$ or Ar is used for plasma treatment, the gas used for the plasma treatment mixed in a surface layer of the organic insulating layer can be specified by performing component analysis using an XPS apparatus or other analyzers.

By performing heat-treatment after the transparent conductive layer 155 to become the transparent electrode 157 is formed in the peripheral region 160 (FIG. 2), the crystallinity of the transparent conductive layer 155 is improved and thus the resistance of the transparent electrode 157 in the inorganic insulating layer 144 is reduced. As a result, the line resistance on the inorganic insulating layer 144 is also reduced.

As described above with reference to FIG. 13, the sheet resistance is reduced as the annealing temperature is increased.

Referring to FIG. 11, the annealing is performed after the transparent conductive layer 155 is formed on the organic insulating layer 49 and the inorganic insulating layer 144. The annealing may be performed in a nitrogen atmosphere or in the air. The annealing is performed, for example, a single-substrate type oven.

Then, steps (b) through (d) described above with reference to FIG. 11 are performed.

According to the present invention, steps (b) through (d) and steps (e) through (g) shown in FIG. 6 can be substantially in the same step performed. Thus, the production process is shortened, resulting in reduced production cost and improved production ability. Additionally, since the number of photoresist patterning steps is lowered, reduction in the yield due to patterning defect can be avoided. The amount of required photoresist and a photoresist removing solution is reduced. Since the number of times that the organic insulating layer is immersed in the photoresist removing solution is reduced, the swelling of organic insulating layer can be minimized, as a result of which the quality reliability of the liquid crystal display device is improved.

Hereinafter, a specific example of a method for producing an electrode substrate 1700 according to the present invention will be described with reference to FIG. 18.

In step (a), an inorganic insulating layer 1444 is formed on an area of an insulating plate 1420. The insulating plate 1420 can be formed of transparent glass or plastic materials. Usable plastic materials include, for example, polyimide, polyethylene terephthalate, polyacrylate, and polyethylene. The inorganic insulating layer 1444 is formed of, for example, $SiO_2$, $SiN_x$, or $Ta_2O_5$ and is formed to a thickness of, for example, 50 to 500 nm.

In step (b), an organic insulating layer 1449 is formed on another area of the insulating plate 1420. The organic insulating layer 1449 is formed of, for example, an epoxy resin, an acrylic resin or polycarbonate, and is formed to a thickness of, for example, 10 nm to 1 mm.

In step (c), a transparent conductive layer 1455 is formed on the insulating plate 1420 so as to cover the inorganic insulating layer 1444 and the organic insulating layer 1449 by sputtering or the like. The transparent conductive layer 1455 can be formed of ITO. The transparent conductive layer 1455 is formed to a thickness of 50 to 300 nm.

In step (d), a photoresist layer 1465 is formed on the entire surface of the transparent conductive layer 1455 and is patterned to be left only on areas of the transparent conductive layer 1465 which are to be left as electrodes. The photoresist layer 1465 can be formed of a novolac resin, and the wet-etchant can be a mixture solution of $FeCl_3$ and HCl or HBr. Then, the transparent conductive layer 1455 is etched using the photoresist layer 1465 as a mask.

Instep (e), the photoresist layer 1465 is removed, thereby forming the electrodes 1456 and 1457 each having a prescribed shape respectively on the inorganic insulating layer 1444 and the organic insulating layer 1449. Plasma treatment is performed before the transparent conductive layer 1455 is formed and/or the heat treatment is performed after the transparent conductive layer 1455 is formed, so that the etching shift of the transparent conductive layer 1455 on the organic insulating layer 1449 and the transparent conductive layer 1455 on the inorganic insulating layer 1444 is not too different from each other to etch the transparent conductive layer 1455 at two different areas in the same step.

The method for forming the inorganic insulating layer 1444 and the organic insulating layer 1449 can be appropriately selected in accordance with the materials thereof. Specifically, letterpress, screen printing, spin-coating or the like can be used. The transparent conductive layer 1455 can be heat-treated or irradiated with ultraviolet light.

As a result of a peeling test, it was found that the transparent conductive layer 1455 formed in this manner has a satisfactory adherence with the inorganic insulating layer 1444 and with the organic insulating layer 1449.

The electrode substrate 1700 includes the organic insulating layer 1449 and the inorganic insulating layer 1444 formed on the insulating plate 1420. The present invention is also applicable to, for example, an electrode substrate 1800 shown in FIG. 19. The electrode substrate 1800 includes a plastic insulating substrate 1420, an inorganic insulating layer 1444 provided on an area of the plastic insulating substrate 1420, a transparent conductive layer 1455 provided on the inorganic insulating layer 1444 and also on another area of the plastic insulating substrate 1420. The electrode substrate 1800 having such a structure can incorporate an IC including a switching device and the like on the inorganic insulating layer 1444. The transparent conductive layer 1455 is usable as a line as well as an electrode for controlling the liquid crystal molecules or the like.

According to the present invention, (1) plasma treatment performed before the transparent conductive layer is formed, (2) control of the crystal particle of the transparent conductive layer, and (3) heat-treatment (i.e., annealing) of the transparent conductive layer, and (4) a combination of at least two of (1) through (3) is conducted. As a result, the transparent conductive layer in contact with the organic insulating layer and the transparent conductive layer in contact with the inorganic insulating layer can be etched in the same step. Therefore, the production process of the electrode substrate is shortened, and the production cost of the electrode substrate and thus the production cost of the display device including the electrode substrate is reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing an electrode substrate having an organic insulating region formed of an organic insulating material and an inorganic insulating region formed of an inorganic insulating material on an identical side thereof, comprising the steps of:

performing a plasma treatment of the organic insulating region;

forming a first transparent conductive layer in contact with the organic insulating region and a second transparent conductive layer in contact with the inorganic insulating region; and etching the first transparent conductive layer and the second transparent conductive layer in the same step.

2. A method for producing an electrode substrate according to claim 1, wherein the step of performing the plasma treatment includes the step of performing a plasma treatment of the inorganic insulating region in the same step with the plasma treatment of the organic insulating region.

3. A method for producing an electrode substrate according to claim 1, wherein the plasma treatment is selected from the group consisting of an oxygen plasma treatment, an Ar plasma treatment and a $CF_4$ plasma treatment.

4. A method for producing an electrode substrate according to claim 1, wherein the plasma treatment includes the step of performing an oxygen plasma treatment and the step of performing an Ar plasma treatment following the step of performing the oxygen plasma treatment.

5. A method for producing an electrode substrate according to claim 1, wherein the plasma treatment includes the step of performing an oxygen plasma treatment and the step of performing a $CF_4$ plasma treatment following the step of performing the oxygen plasma treatment.

6. A method for producing an electrode substrate according to claim 1, wherein the plasma treatment makes a root-mean-square of a surface roughness of the organic insulating layer 1.0 nm or less.

7. A method for producing an electrode substrate according to claim 1, further comprising the step of heat-treating the first transparent conductive layer and the second transparent conductive layer after the step of plasma treatment.

8. A method for producing an electrode substrate according to claim 7, wherein the heat-treatment is performed at a temperature of 150° C. or higher and 220° C. or lower.

9. A method for producing an electrode substrate having an organic insulating region formed of an organic insulating material and an inorganic insulating region formed of an inorganic insulating material on an identical side thereof, comprising the steps of:

forming a first transparent conductive layer in contact with the organic insulating region and a second transparent conductive layer in contact with the inorganic insulating region so that the first transparent conductive layer has a crystal grain size of 20 nm or more and 50 nm or less; and etching the first transparent conductive layer and the second transparent conductive layer in the same step.

10. A method for producing an electrode substrate according to claim 9, wherein the first transparent conductive layer has a crystal grain size of 20 nm or more and 40 nm or less.

11. A method for producing an electrode substrate according to claim 9, further comprising the step of performing a plasma treatment of the organic insulating region before the first transparent conductive layer is formed.

12. A method for producing an electrode substrate having an organic insulating region formed of an organic insulating material and an inorganic insulating region formed of an inorganic insulating material on an identical side thereof, comprising the steps of:

forming a first transparent conductive layer in contact with the organic insulating region and a second transparent conductive layer in contact with the inorganic insulating region;

heat-treating the first transparent conductive layer and the second transparent conductive layer; and etching the first transparent conductive layer and the second transparent conductive layer in the same step.

13. A method for producing an electrode substrate according to claim 12, wherein the heat-treatment is performed at a temperature of 150° C. or higher and 220° C. or lower which is maintained for a certain period of time.

14. A method for producing an electrode substrate according to claim 13, wherein the heat-treatment is performed at a temperature of 200° C. or higher and 220° C. or lower which is maintained for a certain period of time.

* * * * *